(12) United States Patent
Lu et al.

(10) Patent No.: US 6,829,477 B1
(45) Date of Patent: Dec. 7, 2004

(54) PRIVATE MULTIPLEXING CELLULAR NETWORK

(75) Inventors: Priscilla M. Lu, San Carlos, CA (US); Timothy R. White, Palo Alto, CA (US); Ian Sayers, Berkshire (GB)

(73) Assignee: interWave Communications International, Ltd., Hamilton (BM)

( * ) Notice: Subject to any disclaimer, the term of this patent is extended or adjusted under 35 U.S.C. 154(b) by 0 days.

(21) Appl. No.: 09/242,988

(22) PCT Filed: Aug. 27, 1997

(86) PCT No.: PCT/US97/15213

§ 371 (c)(1),
(2), (4) Date: Oct. 22, 1999

(87) PCT Pub. No.: WO98/09457

PCT Pub. Date: Mar. 5, 1998

(Under 37 CFR 1.47)

(51) Int. Cl.[7] ................................................ H04Q 7/20
(52) U.S. Cl. ............................... 455/426.1; 455/422.1; 455/435.1; 455/560; 455/552.1
(58) Field of Search ................................ 370/328, 310, 370/329, 330; 455/552, 432, 422, 426, 435, 553, 554, 560, 462, 465, 561, 422.1, 426.1, 435.1, 552.1, 553.1, 554.1

(56) References Cited

U.S. PATENT DOCUMENTS

| | | |
|---|---|---|
| 4,726,014 A | 2/1988 | Goldman et al. |
| 5,157,709 A | 10/1992 | Ohteru .................... 370/329 |
| 5,260,987 A | 11/1993 | Mauger |
| 5,386,466 A | 1/1995 | Bales et al. ................ 379/229 |
| 5,442,633 A | 8/1995 | Perkins et al. |
| 5,479,483 A | 12/1995 | Furuya et al. ............. 379/60 |
| 5,504,804 A | 4/1996 | Widmark et al. .......... 379/63 |
| 5,506,837 A | 4/1996 | Söllner et al. ............ 370/31 |

(List continued on next page.)

FOREIGN PATENT DOCUMENTS

| | | |
|---|---|---|
| EP | 462727 A2 | 12/1991 |
| EP | 462728 A2 | 12/1991 |
| EP | 566407 A2 | 10/1993 |
| EP | 587211 A2 | 3/1994 |
| EP | 595392 A1 | 5/1994 |
| EP | 600681 A1 | 6/1994 |
| EP | 605086 A1 | 7/1994 |
| EP | 605311 A1 | 7/1994 |
| GB | 2249693 | 5/1992 |
| WO | WO92/19078 | 10/1992 |
| WO | WO93/11625 | 6/1993 |
| WO | WO94/05126 | 3/1994 |
| WO | WO94/26073 | 10/1994 |
| WO | WO95/24789 | 9/1995 |

OTHER PUBLICATIONS

Hollis, JB, Air Interface Protocols for a National Mobile Data Network. IEEE Collq. (1993) No. 003: Cordless Computing –Systems and User Experience, pp. 1–5.

*Primary Examiner*—Sonny Trinh
(74) *Attorney, Agent, or Firm*—Dorsey & Whitney

(57) ABSTRACT

A private multiplexing cellular network for facilitating cellular communication for private mobile stations (MS's), public MS's, and hybrid MS's. The private multiplexing cellular network includes a multiplexing circuit coupled to its radio subsystem. The multiplexing circuit is in turn coupled to two A-interfaces: a private A-interface for coupling the private radio subsystem with the private Mobile Switching Center (MSC), and a public A-interface for coupling the private radio subsystem with the public MSC. Intelligence is also provided with the multiplexing circuit to decide, based on a number of parameters, whether the public MSC or the private MSC should handle a given service request.

8 Claims, 12 Drawing Sheets

U.S. PATENT DOCUMENTS

| | | | |
|---|---|---|---|
| 5,506,887 A | 4/1996 | Emery et al. | 379/58 |
| 5,512,884 A | 4/1996 | Hesse et al. | 370/329 |
| 5,528,664 A | 6/1996 | Slekys et al. | 370/329 |
| 5,528,668 A | 6/1996 | Aihara | 379/60 |
| 5,537,610 A * | 7/1996 | Mauger et al. | 455/435.3 |
| 5,577,029 A * | 11/1996 | Lu et al. | 455/445 |
| 5,577,031 A | 11/1996 | Smith | 370/329 |
| 5,734,699 A * | 3/1998 | Lu et al. | 455/422 |
| 5,761,195 A * | 6/1998 | Lu et al. | 370/329 |
| 5,761,620 A * | 6/1998 | Furuya et al. | 455/435.2 |
| 5,765,111 A * | 6/1998 | Kim | 455/462 |
| 5,818,824 A * | 10/1998 | Lu et al. | 370/328 |
| 5,913,166 A * | 6/1999 | Buttitta et al. | 455/436 |
| 6,542,741 B2 * | 4/2003 | Wallstedt et al. | 455/434 |

* cited by examiner

| MS IDENTITY (IMSI/TMSI) | A-INTERFACE PRIVATE/PUBLIC |
|---|---|
| MS ID # 1 | PUBLIC |
| MS ID # 2 | PRIVATE |
| MS ID # 3 | PUBLIC |

| CALL TYPE \ DESIGNATED CELL TYPE | PUBLIC | PRIVATE | BOTH |
|---|---|---|---|
| PUBLIC | ALLOWED 1202 | N/A 1204 | ALLOWED 1206 |
| PRIVATE | N/A 1208 | ALLOWED 1210 | ALLOWED 1212 |

| POTENTIAL DESTINATION CELL ID | DESIGNATED CELL TYPE |
|---|---|
| 1002 | PRIVATE |
| 1008 | BOTH |
| 1010 | BOTH |
| 1014 | PUBLIC |
| ooo | ooo |

FIG. 11

PRIVATE MULTIPLEXING CELLULAR NETWORK

BACKGROUND OF THE INVENTION

The present invention relates to apparatuses and methods for implementing mobile communication. More particularly, the present invention relates to a novel private multiplexing cellular network, as well as components therefor, that advantageously offers cellular coverage to private cellular phone sets, i.e., private mobile stations (MS's), public cellular phone sets, i.e., public mobile stations (MS's), and hybrid private-public cellular phone sets, i.e., hybrid mobile stations (MS's) in a seamless manner. In accordance with one aspect of the present invention, the coverage area under control of the private radio subsystem can be used by private MS's (and hybrid MS's in certain predefined circumstances) as if it is part of the private network, and by the public MS's (and hybrid MS's in certain other predefined circumstances) as if it is part of the public network.

Mobile communication is known in the art. One limited form of mobile communication involves prior art cordless phones. In the prior art cordless phone system, each cordless phone set typically comprises a base unit and a cordless unit. The base unit, typically located inside a residence or a business office, is usually coupled physically by copper wires or fiber optics to the public switched telephone network (PSTN). To uniquely identifies it in the public network, each cordless phone set is specifically associated with a telephone number.

Further, each cordless phone's base unit is specifically associated with its cordless unit and communicates therewith in a wireless manner. As long as a user of the prior art cordless unit stays within the limited range of the associated base unit (under a quarter mile in most cases due to technical limitations inherent in cordless technology), calls may be made to and from the public network in a wireless manner.

However, the prior art cordless phone has some significant disadvantages. Besides the limited range, the prior art cordless technology is limited in the number of cordless units that a base unit can support. Typically one, no more than two, handset is provided per base unit in the prior art cordless phone. Because of this limitation, a telephone service provider must still run wires, either along telephone poles or in trenches, to each residence or business to enable telephone service, whether or not cordless. Therefore, although the cordless unit appears mobile to the user, the network that is required to implement this service is still essentially a wired telephone network.

Users'demand for mobile communication services, as well as the increasing costs of building and maintaining a wired telephone infrastructure, has turned many service providers to other wireless technologies for answers. Among existing technologies, cellular technology has emerged the clear leader in term of market penetration. In particular, cellular phone systems using a standard known as Global Systems for Mobile Communication (GSM) has steadily gained popularity among service providers as the system of choice for implementing cellular service. The popularity of the GSM standard stems from its robustness and its ability to support a rich set of features such as world-wide roaming, phone mail, data services, supplemental services, and the like. Information regarding the GSM standard is widely available in the public domain, some of which are cited in Appendix B herein.

For illustration purposes, FIG. 1 illustrates a representative prior art public cellular communication system. For illustration purposes, a cellular communication system for use with the Global Systems for Mobile Communication (GSM) protocol is shown in FIG. 1. Referring to FIG. 1, there are shown four mobile station units (MS), also known as cellular handsets, 150, 152, 154, and 156, which communicate to an antenna subsystem 158. As is known to those familiar with the GSM protocol, MS's 150–156 typically communicate with antenna subsystem 158 via a radio link (RL) protocol. As is known, the radio link (RL) protocol is a LAPD-M protocol at GSM layer 2 and is defined by standard GSM 08.58.

Antenna subsystem 158 couples to transceiver units (TRX) 160 and 162 of base transceiver station (BTS) unit 164 as shown. Each of TRX's 160–162 outputs bearer data, which may be 8 Kbits per second (Kbps) or 16 Kbps (GSM) time division multiplexed (TDM) data representing, for example, voice conversations, facsimile, digital data, and the like. A TRX also outputs signaling information which is packet information that is forwarded either to antenna subsystem 158 for transmitting to the MS's or to a base station control function (BCF) 166 for communicating with a base station controller (BSC) or a mobile services switching center (MSC). The mobile services switching center (MSC) will be discussed later herein.

From the GSM point of view, each of MS's 150–156 contains hardware and software that can handle from its end functions such as radio resources control (RR), mobility management (MM), call control (CC), short message service (SMS), and supplemental services (SS). Base control function (BCF) 166 is coupled to a transcoder-rate adapter unit (TRAU) 168 for switching between either 8 Kbps or 16 Kbps to 64 Kbps TDM data before being passed on to the BSC. A transcoder-rate adapter unit (TRAU) is used for performing rate adaptation, or voice transcoding, between MS units communicating at different rates.

TRAU unit 168 is coupled to an E1 module 170 of BTS unit 164. E1 module 170 represents the means by which BTS unit 164 can communicate with a base station controller (BSC) unit 172. In one embodiment, E1 module 170 represents a 2.048 Mbits signaling wired interface that is channelized into 64K bits channels. BCF 166 represents a CPU module that runs the software to handle provisioning of the TRAU or E1 resources at the request of base station controller (BSC) 172.

In the prior art, BTS unit 164 is essentially a "dumb" subsystem that operates responsive to commands from BSC unit 172. For example, when BSC 172 first powers up, it will configure BTS unit 164 via a link 174 by down loading the configuration data across link 174. Link 174 represents the terrestrial link that carries the TDM data between BTS unit 164 and BSC unit 172, typically using an interface known as Abis.

A BSC unit may have multiple E1 modules for communicating with multiple BTS's. For example, BSC unit 172 is shown having 3 E1 modules 176, 178, or 180 for communicating with 3 or more BTS's. Furthermore, although BTS 164 shows only two transceiver units 160 and 162 for illustration purposes, it should be understood that a typical BTS unit may have any number of transceiver units.

Functionally speaking, the job of BSC unit 172 is radio resource (RR) control. It manages certain requirements regarding the status and location of the mobile stations and details regarding how to communicate with the mobile stations in the appropriate modulation scheme. In this manner, BSC unit 172 helps to hide this level of detail from any components upstream, e.g., mobile services switching center (MSC) 182 or the public network that is upstream from MSC 182. BSC unit 172 also handles power control. BSC unit 172 directs BTS unit 164 and a transceiver unit therein to increase or decrease its transmission power from a handset to improve transmission quality.

Furthermore, BSC unit 172 also monitors handset communication quality to prepare for power handovers, e.g., when one of the handsets roams among the different areas controlled by different BTS's. When a hand-over is eminent, BSC unit 172 further initiates the hand-over. The intra-BSC hand-over of the prior art ensures that communication for a single circuit between a given mobile station and MSC unit 182 remains uninterrupted during handover.

BSC unit 172 further includes processor 184 for handling the aforementioned radio resource control (RR), optional TRAU unit 186, and an E1 module 190. E1 module 190 provides the means through which BSC unit 172 can communicate with MSC unit 182.

MSC unit 182 may communicate with any number of BSC unit 172 and includes, among other things, an E1 module 192, a processor 193, and a gateway MSC unit 194. GMSC unit 194 facilitates communication between the cellular communication system of FIG. 1 and the outside world, e.g., the public network. GMSC 194 is coupled to a link 194 for communicating with the public network. As is known, the communication between MSC 182 and the public network may be performed via the E interface.

As is also known to those familiar with the GSM specification, MSC unit 182 further include circuits to handle mobility management (MM), call control (CC) short message service (SMS), and other supplemental services (SS). Optionally, MSC unit 182 performs some radio resource (RR) handling, e.g., inter BSC and inter MSC handovers. Inter BSC occurs when a mobile station roams among the BSC's. In this case, the radio resource control must be handled by the upstream MSC since a BSC would not know how to hand-over to another BSC when the mobile station roams from a BSC to another BSC.

Although public cellular networks, such as that described in FIG. 1, satisfactorily provide cellular communication capabilities for large urban areas, there are drawbacks. Among the drawbacks discussed in connection with the aforementioned co-pending patent application Ser. No. 08/435,709 are the inefficient backhauling of bearer data channels back to the public MSC for cross-connecting, the indiscriminate use of rate adaptation resources (TRAU) for data channels that do not necessarily require rate adaptation, and the fact that a functional public cellular network may not be a cost-effective solution for geographically remote or applications where the end-user wishes to retain a high degree of control over the addition or removal of users.

In the aforementioned co-pending patent application Ser. No. 08/435,709, there are described methods and apparatuses for implementing various combinations of private cellular networks to address the aforementioned drawbacks of public cellular networks. Referring now to FIG. 2A, there is shown a private cellular network 200, representing a private cellular network of the type disclosed in co-pending patent application Ser. No. 08/435,709. Private cellular network 200 may be coupled to a public network 202 via a connection 204. The coupling between cPBX 200 and public network 202 may be accomplished, in one embodiment, via an E1 interface which may represent a wired or a microwave link.

Private cellular network 200 has sufficient resources to perform switching and communication management among its private MS's without assistance from the public network. Advantageously, the mobility, roaming, and hand-off capabilities are handled by the resources within private cellular network 200 without the intervention of public network 202. Additional resources or features may thus be added to the private cellular network for the benefit of owners of private MS's without requiring corresponding changes in the public network.

Within private cellular network 200, shown are a cPBX subsystem 206, a BSC subsystem 208 and BTS subsystem 210, and MS units 212 and 214. As will be discussed later, cPBX subsystem 206, BSC subsystem 208 and BTS subsystem 210 represent the enhanced versions of the respective MSC, BSC and BTS of the prior art.

MS units 212 and 214 represent standard cellular handsets which are GSM standard handsets in the preferred embodiment. MS 212 and 214 communicate with BTS subsystem 210 via an appropriate cellular interface such as the aforementioned radio link (RL) interface. The typical radius of operation between each MS unit and a BTS subsystem is in the range of 2 to 3 Kilometers, which is substantially greater than the 200 meter range typically offered by the prior art wireless wPBX. The additional range offered by the cellular cPBX of FIG. 2A represents a significant advantage because it is difficult, as is well known to those skilled in the communication art, to scale up the distance offered by the prior art wireless bases and cordless handsets due to interference problems inherent in the prior art cordless technology.

Each cPBX subsystem 206 is capable of coupling to more than one BSC subsystem 208. BSC subsystem 208 communicates with cPBX subsystem 206 via link 216 using, for example, an A interface. Similarly, each BSC subsystem 208 is capable of coupling to more than one BTS subsystem 210. BTS subsystem 210 is coupled to BSC subsystem 208 via link 218 utilizing, for example, Abis interface. Further, each BTS subsystem 210 is capable of coupling to a number of MS units, of which only two are shown. In this manner, private cellular network 200 is organized in a hierarchy, the top of which is occupied by cPBX subsystem 206. Depending on system configuration, the cPBX configuration shown in FIG. 2A can handle as few as 7 simultaneous calls up to as many as 1,000 (correlating to up to 10,000 MS's)

It should be understood that the drawing of FIG. 2A is a functional representation and that the different components of the private cellular network 200 may either be integrated to co-locate at the same location or on a single chassis or dispersed in a wide geographic area to increase the domain of the private network. The ability to configure a physical chassis to perform individual BTS, BSC, or cPBX function, or any combination of these subsystems, represents a unique advantage of the private network disclosed in co-pending patent application Ser. No. 08/435,709.

As will be discussed later, the components of private cellular network 200 are designed such that they can be added or removed from private cellular network 200 in a modular fashion. In this manner, a scalable private cellular network may be realized, whose capabilities may be expanded or shrunk as necessary to fill the need of a particular site.

In the purely private network configuration, each MS unit, e.g., MS units 212 and 214, is registered with and recognizable by cPBX subsystem 206. More particularly, the information associated with each MS unit is registered in a home location registry (HLR) in cPBX subsystem 206. The registration of an MS unit with the HLR registry in cPBX subsystem 206 permits that MS unit to be recognized as a private MS unit and to utilize the resources of private cellular network 200 for cellular communication. For example, a registered MS unit may make calls via BTS subsystem 210, BSC subsystem 208, and cPBX subsystem 206 to a telephone set in public network 202. Alternatively, MS unit 212, being an MS unit that is registered with the HLR registry within cPBX subsystem 206 may make a local call to another MS unit also registered with the HLR registry within cPBX subsystem 206, e.g., MS unit 214 via BTS subsystem 210. When an MS unit is registered with the HLR registry in cPBX 206, it may also receive a call, whether from public network 202 or from another MS unit that is registered with the same HLR registry.

In the purely private network configuration of FIG. 2A, a standard GSM handset that is not registered with the HLR registry within cPBX subsystem 206 is deemed a non-native handset and cannot use the resources of private cellular network 200 to make or receive calls. Further, each of BTS subsystem 210, BSC subsystem 208, and cPBX subsystem 206 is furnished with intelligent cross-connect capability. Consequently, the actual cross-connect that builds the connection between the calling MS unit and the receiving MS unit may be distributed down from cPBX subsystem 206, e.g. to BSC subsystem 208 or BTS subsystem 210. For example, MS units 212 and 214 may be cross-connected at a lower level in the hierarchy, e.g., BTS subsystem 210, instead of at a higher level, e.g., at cPBX subsystem 206. If the call is made between MS units controlled by the same BSC subsystem, e.g., BSC subsystem 208 but different BTS subsystems, the cross-connect switching may be performed at BSC subsystem 208 instead of at cPBX subsystem 206. In this manner, the channels containing the bearer data between MS units do not always have to be backhauled all the way to cPBX subsystem 206.

The intelligence switch capability in the subsystems of private cellular network 200 permits the entire network to handle more traffic by freeing up the bandwidth leading to cPBX subsystem 206 if the required cross-connect between channels carrying bearer data could be performed by a component further down the hierarchy.

In the prior art public cellular systems, e.g., the public cellular system of FIG. 1, cross-connection among call paths is centralized at a central public mobile services switching center. In the prior art, all circuits between the BTS and MSC are rate-adapted, or TRAUed, before the MSC and all MSC cross connect functions are performed at 64 Kbps. This necessitates two TRAUing functions to be performed for calls between two 16 Kbps handsets controlled by the same MSC. In the private network of FIG. 2A, the TRAU is advantageously associated with the gateway to the public network, and need not be employed for calls internal to the network. There is provided TRAU resource within the network, however, to accomplish rate adaptation when necessary, e.g. for calls between a 8 Kbps handset and a 16 Kbps handset.

It is observed that GSM standard MS units in private cellular network 200 transmit and receive data at a predefined rate, say 8 Kbps or 16 Kbps. Since the channels carrying bearer data may be cross-connected by a subsystem within the inventive private cellular network 200 instead of at the public MSC, it is often not necessary to TRAU the bearer data channels for calls between MS units within the private cellular network 200. Consequently, the ability to cross-connect certain calls within the private network without TRAUing advantageously improves communication quality and reduces the computational overhead associated with TRAUing.

FIG. 2B shows in a symbolic format cPBX subsystem 206 of FIG. 2A. Within cPBX subsystem 206, shown are a gateway MSC (GMSC) block 250, a registry 252 which contains both the home location registry (HLR) and the visitor location registry (VLR registry), a private MSC block 254 and a cPBX block 256. GMSC block 250 represents the interface for communicating with the public network, e.g., public network 202 of FIG. 2A. Within GMSC block 250, there is shown a public network interface 258 and a transcoder/rate adapter unit (TRAU) block 260. In one embodiment, public network interface 258 represents a trunk module which has been loaded with the appropriate software for communicating with the public network via standard interfaces such as ISDN, R2, and analog interfaces using inband or common analog signaling.

TRAU block 260 resides in GMSC block 250 to facilitate rate adaptation to build a call between an MS unit of the private cellular network and a telephone set in public network 202 of FIG. 2A. Rate adaptation is necessary because a GSM MS unit and a public network typically transmits and receives data at different rates. It is important to note that the present invention eliminates the TRAUing function whenever possible for calls that are switched within the private cellular network, e.g., between MS units controlled by cPBX subsystem 206. In contrast, prior art public cellular systems automatically provide TRAUing between the prior art BTS and the prior art MSC, either at the BTS, BSC, or between the BSC and the MSC.

In the prior art wireless wPBX, a registry is not necessary since cordless phones are associated with a particular base and do not roam from base to base. In contrast, a registry is preferably provided in the private cellular network of FIG. 2A to provide mobility management of the MS's. Furthermore, the home location registry (HLR) and visitor location registry (VLR registry) are preferably integrated in registry 252 of the private cellular network.

Registry 252 of private cellular network 200 of FIG. 2B serves, among others, to keep track of MS units that are authorized to use the resources of the private cellular network, the subscriber data such as names, unique identification information such as is kept in Subscriber Identification Module (SIM) for GSM handsets, telephone numbers associated with the MS units, and the like. Subscriber information is kept track of because private cellular network 200 must keep track of the MS units controlled by it as well as the subscribers on its network.

PBX block 256 handles supplemental services (SS) that may be offered by private cellular network 200. Furthermore, PBX block 256 handles the call control (CC) function, which includes the ability to intelligently understand the destination intended for the telephone number dialed. In one embodiment, the destination intended for the number dialed is determined in accordance to a numbering system. By way of example, extensions 2000 to 6000 may indicate a destination MS unit inside private cellular network 200, while other numbers dialed may indicate calls that must be routed to telephone sets in the public network. PBX block 256 may also contain circuits for performing functions typically expected of a PBX system such as call forwarding, call transfer, and the like.

Private MSC block 254 handles mobility management (MM) and with the help of the PBX (256) radio resource (RR) management. The PBX 256 handles call processing (CC) and Supplemental Services (SS) via the MM session and assists with RR by forwarding calls between cPBX's for handsets that have roamed into the coverage area of other cPBX's or need to be handed over to another cPBX.

Switching decisions are made by the PBX 256. However, in some applications, private MSC 254 may listen to messages sent across the MM session to decide whether or not it should act as a BSC. When acting as a BSC, the PBX function is bypassed, the circuit cross connect function to public MSC is made by the private MSC function.

The intelligence within the private PBX block 256 may decide that switching may be more efficiently performed at a BSC or BTS further down the hierarchy. In this case, there is a signaling connection between the MS units and the cPBX for CC and SS control via the private MSC MM session. However, the switched voice/data path for the call will not traverse the cPBX, but will be cross connected by the BSC's and/or BTS's further down the hierarchy.

Although the strictly private cellular network represents cost-effective and efficient cellular solutions for some markets, it has been recognized that strictly private cellular systems that do not make its radio subsystem resources to public MS's, i.e., MS units not specifically registered with the home location registry of the private network, has some drawbacks in certain applications. For example, some private cellular networks may utilize the same cellular frequency for operation as the public network. In this case, the fact that public MS's cannot utilize the radio resources of the private cellular network to make and receive calls while roaming within the coverage area of the private cellular network means that there is a lapse or "hole" in coverage, from the perspective of the public MS users, while roaming.

In other cases, the private cellular networks may be employed as temporary cellular networks to offer cellular service to geographical locations too remote or economically unrewarding to warrant the implementation of a full-scale public cellular network. In these cases, it may be desirable to build into the private cellular network a migration path such that when the public cellular network eventually grows and reaches the locations currently serviced by the private cellular network, the integration of the private radio subsystem resources into the public network to offer cellular service to public cellular system customers would be gradual and seamless for both the current private cellular system customers (who own private MS's and are registered with the private HLR), and the public cellular system customers (who own public MS's and are not known to the private HLR). Such gradual and seamless migration permits the use of the private radio subsystems by both the private and public MS's to originate and receive cellular services as the public network coverage area grows and encompasses the coverage area under control of the private radio subsystem. Advantageously, the private MS's do not have to be replaced if and when the public network coverage area reaches the private network coverage area, and the public MS's do not have to suffer a lapse of coverage while being within the private network coverage area.

These and other highly desirable features that overcome the disadvantages associated with traditional cordless phone systems as well as strictly private or public cellular systems are realized by the novel private multiplexing cellular network, which is described in details in the text of this specification and its drawings.

SUMMARY OF THE INVENTION

The present invention relates, in one embodiment, to a private multiplexing cellular network that advantageously facilitates cellular communication for private MS's. Further, the inventive private multiplexing cellular network allows the public MSC's to employ its private radio resources to facilitate cellular communication for public MS's in a seamless manner while those public MS's are within the coverage area of the private multiplexing cellular network.

Advantageously, the implementation of a private network does not thereby result in a lapse or "hole" in cellular coverage for users of public MS's. In fact, public MS users can rely on the private multiplexing cellular network to provide radio subsystem resources for cellular communication in areas where the public network coverage has yet to reach. Additionally, the seamless manner with which public MS's employ the private radio subsystem resources to make and receive calls represents an efficient built-in migration path for integrating the private network into the public network in the future. For private MS users, all advantages associated with a private cellular network still apply.

In accordance with one aspect of the present invention, at least one BSC of the private multiplexing cellular network is coupled to a multiplexing circuit. The multiplexing circuit is in turned coupled to two A-interfaces: a private A-interface for communicating with the private MSC and a public A-interface for communicating with the public MSC. Via the multiplexing circuit, calls from within the private multiplexing cellular network coverage area may be built, in a multiplexed manner, to either the public MSC or the private MSC. Likewise, calls that arrive at the private network coverage area via either MSC may be routed, via the multiplexing circuit, to the destination MS within the private network coverage area.

In accordance with yet another aspect of the invention, there is provided within the multiplexing circuit intelligence for deciding whether the public A-interface or the private A-interface should be employed for servicing a service request received from either the MS's within the private multiplexing cellular network coverage area or from one of the MSC's.

In accordance with yet another embodiment of the invention, the private multiplexing cellular network facilitates cellular communication for a class of novel mobile stations, known herein as hybrid mobile stations (MS). A hybrid mobile station has two telephone numbers associated with its Subscriber Identification Module (SIM): a public telephone number which is known to the public network, and a private telephone number, which is known to the private multiplexing cellular network. Since a hybrid MS is known to both networks, albeit via different telephone numbers, a hybrid MS may be operated within both networks. Either of the public or private telephone numbers may be dialed, and the intelligence within the multiplexing circuit decides whether the public MSC or the private MSC should handle the call depending on which number is dialed.

These and other features of the present invention will be presented in more detail in the following specification of the invention, the figures, and the appended claims.

BRIEF DESCRIPTION OF THE DRAWINGS

Additional advantages of the invention will become apparent upon reading the following detailed description and upon reference to the drawings, in which:

FIG. 5 illustrates, in accordance with one aspect of the present invention, a pending page table.

To facilitate discussion.

FIG. 11 illustrates, in accordance with one aspect of the present invention, a modified handover table that includes data useful in handovers among cells.

FIG. 12 illustrates, in accordance with one embodiment of the present invention, a decision matrix for deciding, based on the nature of the call currently in progress, whether a particular potential destination cell may be validly employed for handover purposes.

DESCRIPTION OF THE PREFERRED EMBODIMENT

An invention is described for implementing a novel private multiplexing cellular network. In the following description, numerous specific details are set forth in order to provide a thorough understanding of the present invention. It will be obvious, however, to one skilled in the art, that the present invention may be practiced without some or all of the specific details. In other instances, well-known process steps have not been described in detail in order not to unnecessarily obscure the present invention.

Figure 1:
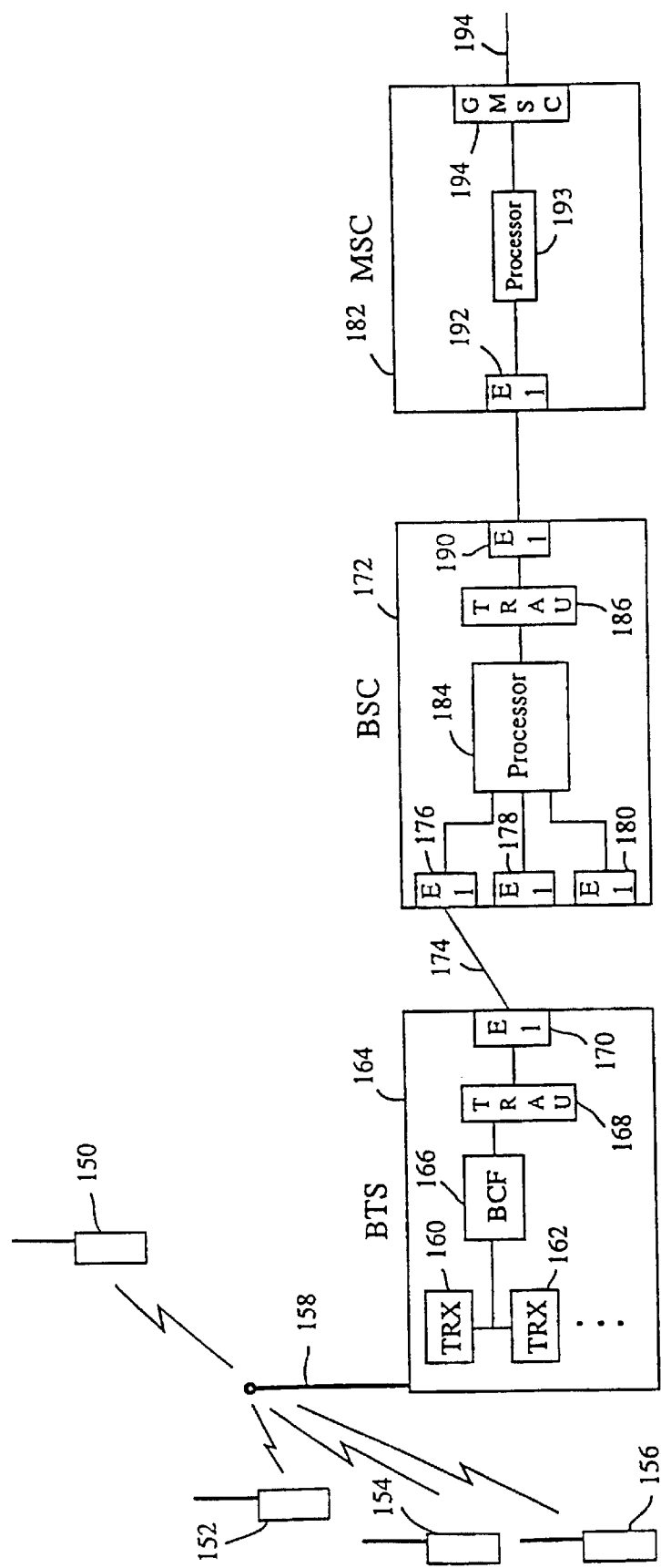
FIG. 1 illustrates a representative prior art public cellular communication system.
Figure 2A:
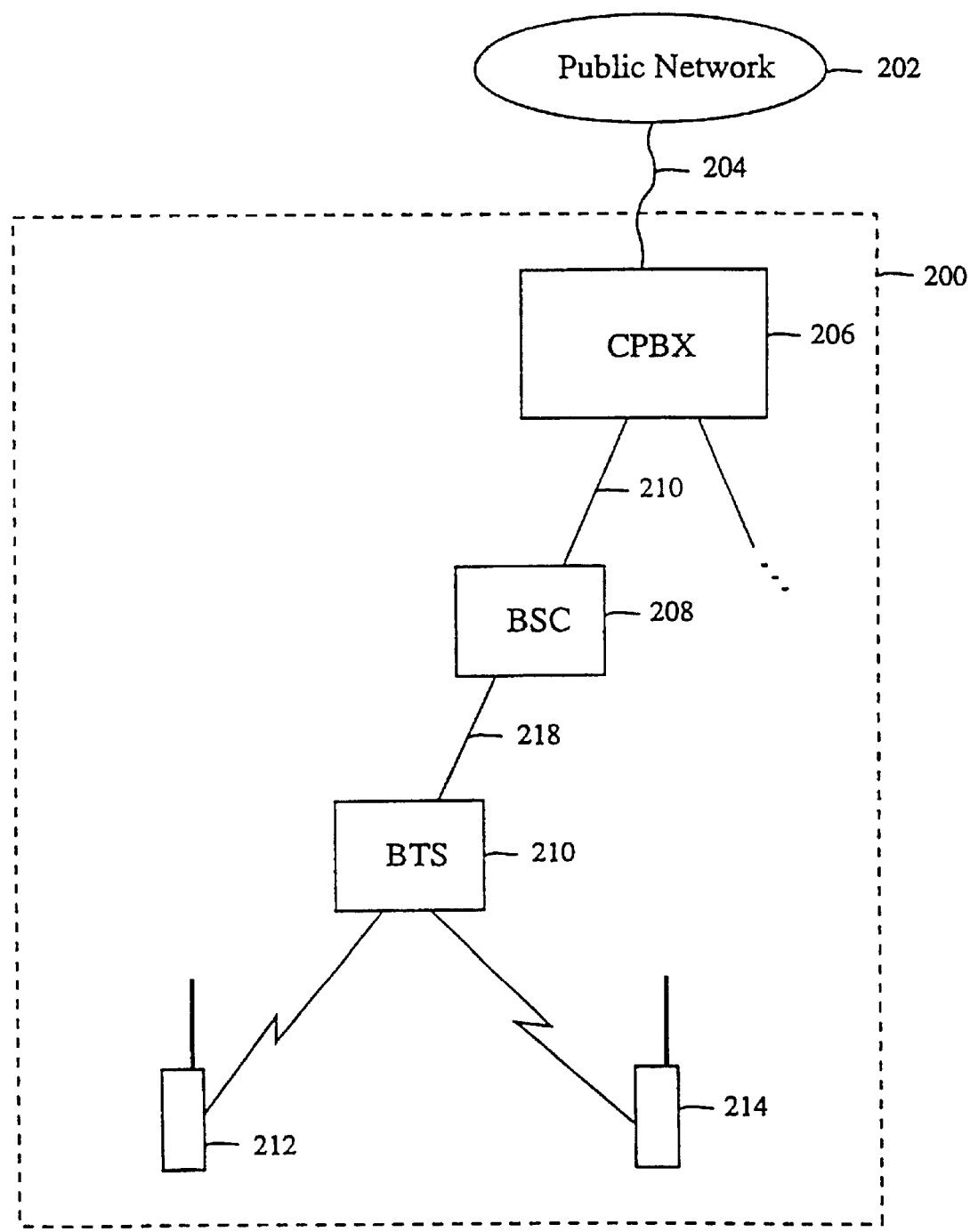
FIGS. 2A and 2B illustrate a private cellular network.
Figure 2B:
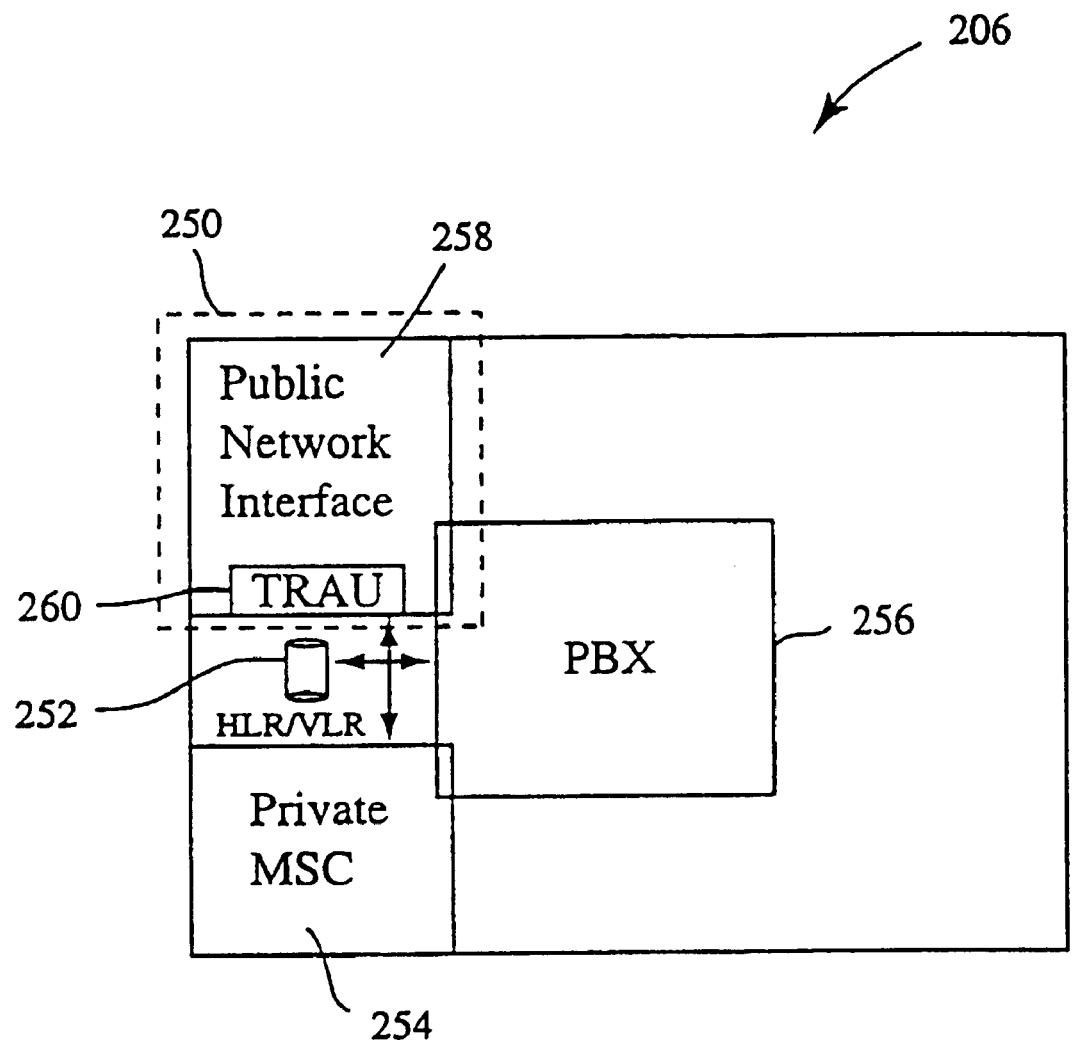
Figure 3:
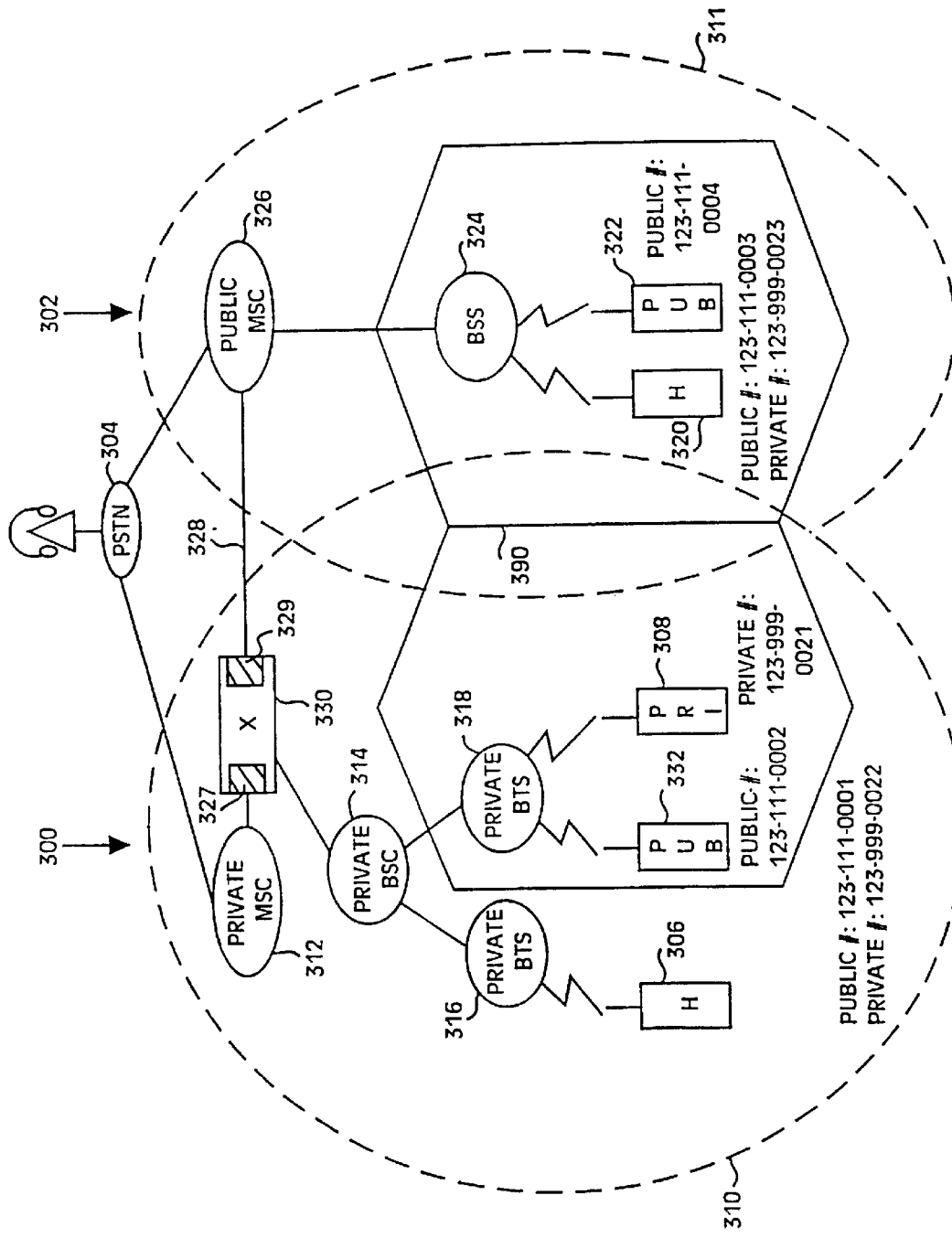
FIG. 3 illustrates, in accordance with one embodiment of the present invention, a private multiplexing cellular network.

FIG. 3 illustrates, in accordance with one embodiment of the present invention, a private multiplexing cellular network 300, which is shown coupled to a public cellular network 302 and a PSTN network 304. Private multiplexing cellular network 300, which employs the GSM protocol for cellular communication, has a coverage area shown in FIG. 3 as private coverage area 310. Within private coverage area 310, private MS's, such as private MS 308, may employ the private MSC and the private radio subsystem of private multiplexing cellular network 300, which includes its private BSC's and private BTS's, to communicate in a cellular manner to other MS's in the private multiplexing cellular network 300, phone sets in PSTN network 304, and MS's in public cellular network 302 (via PSTN 304) in the manner expected of a private cellular network. For further information regarding the details and implementation of a private cellular network that can facilitate cellular communication for its private MS's, reference may be made to the aforementioned patent application Ser. No. 08/435,709.

As the term is employed hereinafter, a private MS is an MS having a single telephone number associated with its Subscriber Identity Module (SIM), which telephone number is "known" to the private multiplexing cellular network 300 (but not known by public cellular network 302). In other words, the SIM of a private MS is known to the HLR of the private multiplexing cellular network 300 (hereinafter "private HLR") and the phone number associated with that SIM is associated with private MSC 312. Although FIG. 3 shows only one private BSC 314 and two private BTS's 316 and 318 for illustration purposes, private multiplexing cellular network 300 may have any number of private BSC's 314 and private BTS's, depending on needs.

Cellular communication in public cellular network 302 is facilitated for the public MS's, such as public MS 322, within public coverage area 311 via the public MSC 326 and the public radio subsystem. A public MS, as the term is used herein, denotes an MS having a single telephone number associated with its SIM. Further, the SIM of a public MS is known to the HLR associated with the public network (hereinafter "public HLR") and the phone number associated with that SIM is associated with public MSC 326. A portion of the public radio subsystem is shown in FIG. 3 as public Base Station Subsystem (BSS) 324. Public cellular networks are well known and are implemented in a variety of ways. Thus, details regarding their implementation will not be repeated here.

Public coverage area 311 may overlap private coverage area 310, as shown in FIG. 3, when the private multiplexing cellular network 300 is implemented in a geographic location that is surrounded by coverage areas under public network control. Alternatively, there may be no overlap between private coverage area 310 and public coverage area 311, such as the case when private multiplexing cellular network 300 is implemented in a geographic location that the public network has yet to reach.

Private multiplexing cellular network 300 also supports a type of hybrid public-private MS's, referred herein as hybrid MS's. In accordance with one aspect of the present invention, hybrid MS's, such as hybrid MS 306 of FIG. 3, has two telephone numbers associated with its SIM: a private telephone number known to private multiplexing cellular network 300 and a public telephone number known to public cellular network 302. In other words, the SIM of a hybrid MS is known by both the private and public HLR. However, the telephone number associated with the SIM in the public HLR, i.e., the telephone number associated with the public MSC 326 (hereinafter "public telephone number") differs from the telephone number associated with the SIM in the private HLR, i.e., the telephone number associated with the private MSC 312 (hereinafter "private telephone number"). Since hybrid MS's are known to both the private MSC and the public MSC, hybrid MS's may employ either the private MSC or the public MSC to facilitate cellular communication.

Since the private telephone number of a hybrid MS is known only within private multiplexing cellular network 300, any call that terminates at the hybrid MS when its private number is dialed must be handled by private MSC 312 (as will be apparent to those skilled in the art, the term "call," "telephone call" or like terms are not intended to be limiting herein and are employed as short hand references to connections that may carry voice, data, fax, short message, and the like). For outgoing service requests that originate from a hybrid MS, private multiplexing cellular network 300 treats the outgoing service request as one originating from a private MS since the identity of the hybrid MS (e.g., its IMSI or TMSI) is known to the private multiplexing cellular network 300. In this manner, a hybrid MS, while being inside private coverage area 310, is treated as a private MS for outgoing service requests or for incoming service requests via its private telephone number. To elaborate, an IMSI (International Mobile Subscriber Identifier) represents the identifier that is uniquely associated with a SIM. A Temporary Mobile Subscriber Identifier (TMSI) represents a temporary identifier that may be used in place of the IMSI to identify an MS during a call.

However, the public telephone number of a hybrid MS is known in public cellular network 302. This allows a hybrid MS to be treated as a public MS for incoming service requests that terminate on it. In other words, the service request to a hybrid MS via its public telephone number may be handled by public MSC 326 within any coverage area available to the public MS's. This includes, for example, public coverage area 311 under control of the public radio subsystem of public network 302. For outgoing service requests, a hybrid MS is treated as a public MS while within public coverage area 311, and its outgoing service requests may be handled by public MSC 326.

Unlike the strictly private cellular network disclosed in co-pending patent application Ser. No. 08/435,709, which does not permit MS's that are not registered with the private cellular network, i.e., with the private HLR, to employ the resources of the private cellular network to make or receive calls, the inventive private multiplexing cellular network 300 advantageously allows those MS's to seamlessly employ the private radio subsystem of the private multiplexing cellular network 300 (and the public MSC) to perform cellular communication when they roam within private coverage area 310. In this manner, the existence of the private multiplexing cellular network does not result in a "hole" in the public network coverage for users of public MS's.

To permit public MS's to utilize the private radio resources, i.e., the private BSC's and the private BTS's of the private network, to facilitate cellular communication, there is provided, in accordance with one aspect of the present invention, a multiplexer circuit 330 for coupling the private radio subsystem to both private MSC 312 and public MSC 326. Multiplexer circuit 330 is coupled to two A-interfaces: public A-interface 329 for communicating with public MSC 326 and private A-interface 327 for communicating with private MSC 312. When appropriately multiplexed, the private radio subsystem appears to public MS owners and public MSC 326 as a seamless part of the public cellular network. Multiplexing circuit 330 may be implemented using any suitable technology, including for example discrete logic, ASICs, processor logic, or even analog circuits. In one embodiment, multiplexing circuit 330 may be implemented via software using, for example, two different drivers to communicate with the public MSC and the private MSC.

Via the multiplexing circuit, a public MS may seamlessly make and receive calls using public MSC 326 and the private radio subsystem when it roams within private coverage area 310. An incoming service request to a hybrid MS via the public telephone number of the hybrid MS may be handled by public MSC 326 (since it knows the public telephone number of the hybrid MS), using either the public radio subsystem or the private radio subsystem depending on the location of the destination hybrid MS. In the above scenarios, public MSC 326 obtains its knowledge regarding whether a public MS or a hybrid MS is within private coverage area 310 via location updates from those MS's.

For calls to and from private MS's, outgoing calls from hybrid MS's when they are within private coverage area 310, or incoming calls to a hybrid MS using the private telephone number, multiplexer circuit 330 permits those calls to be handled by the combination of private radio subsystem/private MSC 312. In this manner, multiplexing circuit 330 multiplexes incoming and outgoing calls to and from MS's within private coverage area 310 so that the appropriate MSC would handle the call. The appropriate MSC may represent either private MSC 312 or public MSC 326, depending on whether the call is incoming or outgoing, whether the MS involved is public, private, or hybrid, and if the latter, whether the public telephone number or the private telephone number is dialed.

In the embodiment, multiplexing circuit 330 is co-resident with private BSC 314. In another embodiment, multiplexing circuit 330 may in fact, be co-resident with private MSC 312 or may represent a stand-alone unit interfacing with private BSC 314, private MSC 312, and public MSC 326. Further, although there may be provided a multiplexing circuit with every private BSC of the private multiplexing cellular network to enable every private BSC to directly couple, in a multiplexed manner, with either the public MSC or the private MSC, such an arrangement is not required. In one embodiment, only some private BSC's are provided with a direct connection to a multiplexing circuit, and other private BSC's may access the desired MSC (public or private) via the private BSC that is coupled to the multiplexing circuit. Alternatively, multiple BSC's may be coupled to a single or a few multiplexing circuits, permitting the BSC's to gain access to the public and private network in a multiplexed manner.

For outgoing calls from an MS within private coverage area 310, MS's with an identity, (e.g., IMSI or TMSI) known to private multiplexing cellular network 300 (whether a hybrid MS or a private MS) are preferably handled by private MSC 312. Outgoing calls from an MS having an identity associated with a SIM not associated with the private HLR are understood to be outgoing calls from public MS's that have roamed into private coverage area 310 and are handled by public MSC 326 using the radio subsystem resources of private multiplexing cellular network 300, i.e., via private BSC 314 and the private BTS's of FIG. 3.

Figure 4:
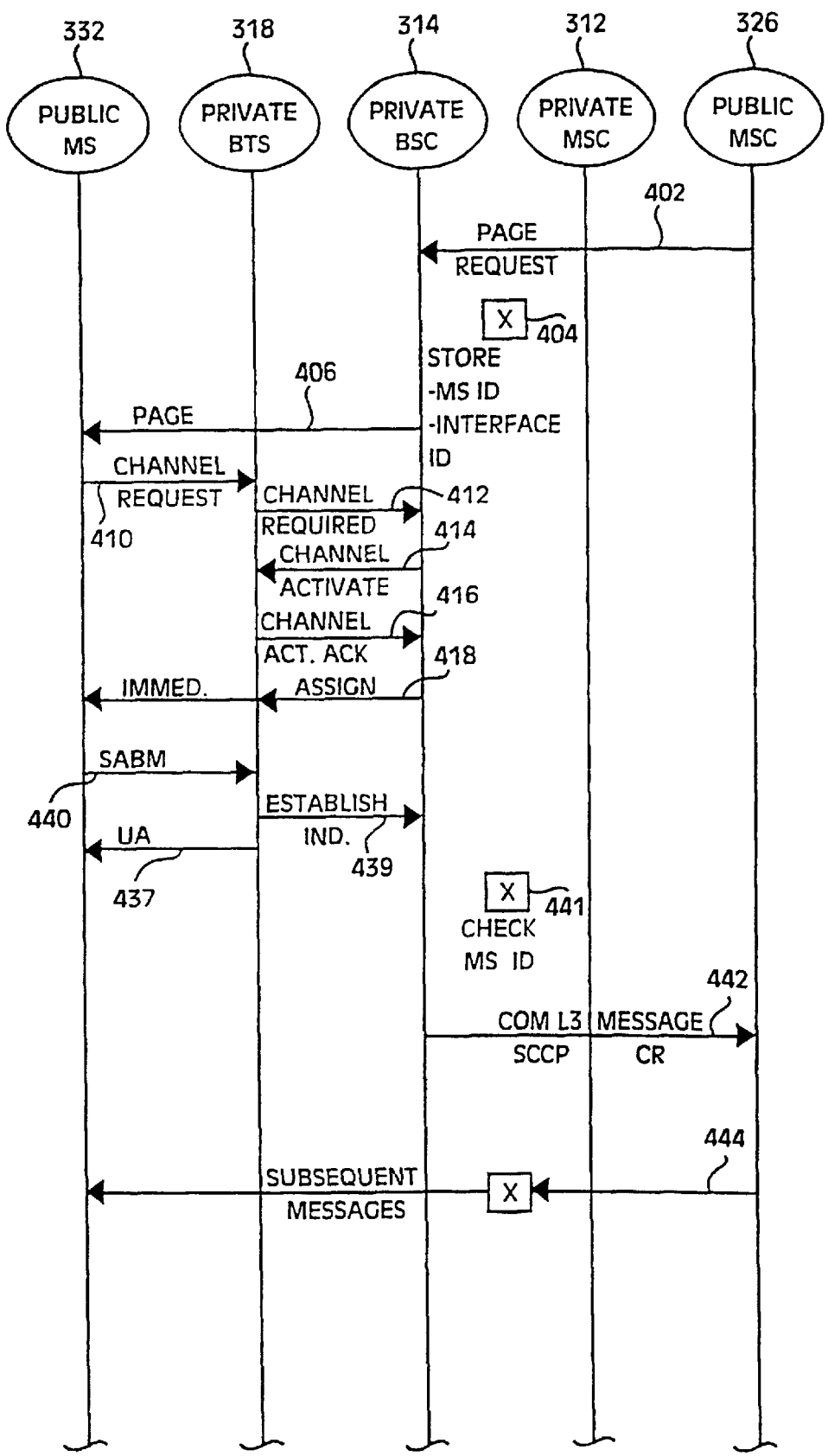
FIG. 4 illustrates, in accordance with once aspect of the present invention, the general call flow for handling an incoming call request from the public MSC.

In FIG. 4 and the figures that follow, the discussion is made with reference to a private multiplexing cellular network 300 wherein multiplexing circuit 330 is co-resident with private BSC 314. However, the implementation of a private multiplexing cellular network 300 wherein multiplexing circuit 330 is external to private BSC 314 (or associated with private MSC 312) should be apparent to those skilled in the art given this disclosure. In both of these latter cases, the switching of traffic channels and packet information between the private BSC and the MSC's across the A-interfaces may employ well-known facilities of the SS7. These implementations may further include additional messages between the BSC and the multiplexing circuit in order to query the content of the Pending Page Table (discussed later in FIG. 5).

FIG. 4 illustrates, in accordance with one aspect of the present invention, the general call flow for handling an incoming service request from the public network, e.g., public cellular network 302 of FIG. 3, via public MSC 326. The service request may represent a request for any type of communication service to the destination MS, including SMS (short message service) or a regular call (fax, voice, or data). In FIG. 4, the destination MS for the service request through public MSC 326 is chosen to be public MS 332 to simplify the discussion although it should be noted that the destination MS may also be a hybrid MS that is called using its public telephone number. To further simplify the illustration task, drawing elements having a like number perform analogous functions in the figures herein.

In FIG. 4, a Page Request message 402 is sent from public MSC 326 to private BSC 314. The Page Request message 402 is first received by multiplexing circuit 330 (on private BSC 314 in this example) from public MSC 326. Page Request message 402 is sent from public MSC 326 if the destination phone number is one that is associated with public MSC 326, i.e., either the destination phone is a public MS, or the destination phone is a hybrid MS, e.g., hybrid MS 306, and the public telephone number of the hybrid MS is dialed. Public MSC 326 knows that the Page Request message 402 should be sent to private BSC 314 since it knows, from the location updates from the public and hybrid MS's, that the MS associated with the dialed telephone number is currently within the coverage area of the private multiplexing cellular network, e.g., private multiplexing cellular network 300.

Page Request 402 includes an identification of the destination MS, e.g., the IMSI or TMSI of the MS being paged by public MSC 326. Once Page Request message 402 is received by multiplexing circuit 330, both the identification of the destination MS (the destination IMSI (or TMSI)) and an A-interface identification (public or private) are stored in a Pending Page Table. The storage operation is represented symbolically in FIG. 4 by block 404. One implementation of the Pending Page Table is shown in FIG. 5.

In FIG. 5, each pending page request for an MS believed to be within private coverage area 310 is stored in an entry of Pending Page Table 500. As mentioned earlier, each entry of Pending Page Table 500 preferably includes the identity of the MS being paged (preferably identified by its IMSI or TMSI), and the identity of the interface through which the page request, e.g., Page Request message 402 of FIG. 4, is sent. In one embodiment, the knowledge regarding the identity of the A-interface through which the Page Request message is sent (private or public) is derived from the fact that the Page Request message is received from either the public A-interface (e.g., A-interface 329 of FIG. 3) or the private A-interface (e.g., A-interface 327).

Entries are preferably kept in Pending Page Table 500 until the page is completed or deemed unsuccessful by the paging BSC or BSC's. For example, once the SCCP connection has been made between the appropriate MSC (either the private MSC or the public MSC), and the MS being paged, the pending page entry in Pending Page Table 500 is removed therefrom.

In one embodiment, race conditions that may occur while paging hybrid MS's are advantageously avoided through the use of Pending Page Table 500. Race conditions may exist since hybrid MS's have two telephone numbers, a private telephone number and a public telephone number, and both of those telephone numbers may be simultaneously dialed, thereby causing the hybrid MS to be paged by both the private MSC and the public MSC. In one embodiment, if a destination MS already has its identity (IMSI or TMSI) stored in Pending Page Table 500, a subsequent page for that destination MS will be dropped and simply does not have its identity entered into Pending Page Table 500. Of course, while a destination MS is busy, a subsequent page for that destination MS may be handled using any conventional technique.

Since the private radio subsystem, which comprises the private BSC's and private BTS's of private multiplexing cellular network 300, appears from the perspective of public MSC 326 as part of the public network, paging requests from public MSC 326 may be received seamlessly by private BSC 314.

Private BSC 314 pages public MS 332 (via private BTS 318) using the Page message 406. Thereafter public MS 332, acting as an MS authorized to use the private radio subsystem of private multiplexing cellular network 300, proceeds to establish communication with public MSC 326. In one embodiment, public MS 332 issues a Channel Request message 410 to private BTS 318 on a random access channel to request a channel for communication. Since private BSC 314 is the entity that actually assigns the channel, this Channel Request message 410 is forwarded from private BTS 318 to private BSC 314 via the Channel Required message 412. Subsequently, private BSC 314 then assigns a channel via the Channel Activate message 414. In one embodiment, private BSC 314 assigns a dedicated signaling channel (e.g., a Standalone Dedicated Control Channel or "SDCCH" channel) for signaling purposes since it is unknown at this point what kind of connection is desired (voice, data, fax, or SMS). On the channel assigned by Channel Activate message 414, control information to and from public MS 332 may be communicated.

Upon receiving Channel Activate message 414, private BTS 318 then replies to private BSC 314 with a Channel Activate Acknowledge message 416. Via the Immediate Assign message 418, private BSC 314 requests that private BTS 318 moves public MS 332 to the channel assigned (which may be the SDCCH channel in one embodiment). The Immediate Assign message is further forwarded by private BTS 318 to public MS 332 as shown in FIG. 4.

After public MS 332 moves to the channel indicated by Immediate Assign message 418, public MS 332 responds with a Set Asynchronous Balance Mode (SABM) message 440, which represents a LAPD-M message requesting a link layer association to establish LAPD-M connection via the SABM message 440. Private BTS 318 acknowledges the receipt of the SABM message 440 with a Unnumbered Acknowledged (UA) message 437.

On top of the SABM message 440, a Service Request via the Complete Layer 3 ("Com L3") message may be piggybacked, which includes the identity of the destination MS, e.g., the IMSI or TMSI of public MS 332 in the illustration of FIG. 4. The Service Request piggybacked on the SABM message 440 is then forwarded from private BTS 318 to private BSC 314 via the Establish Indication message 439.

Figure 6:
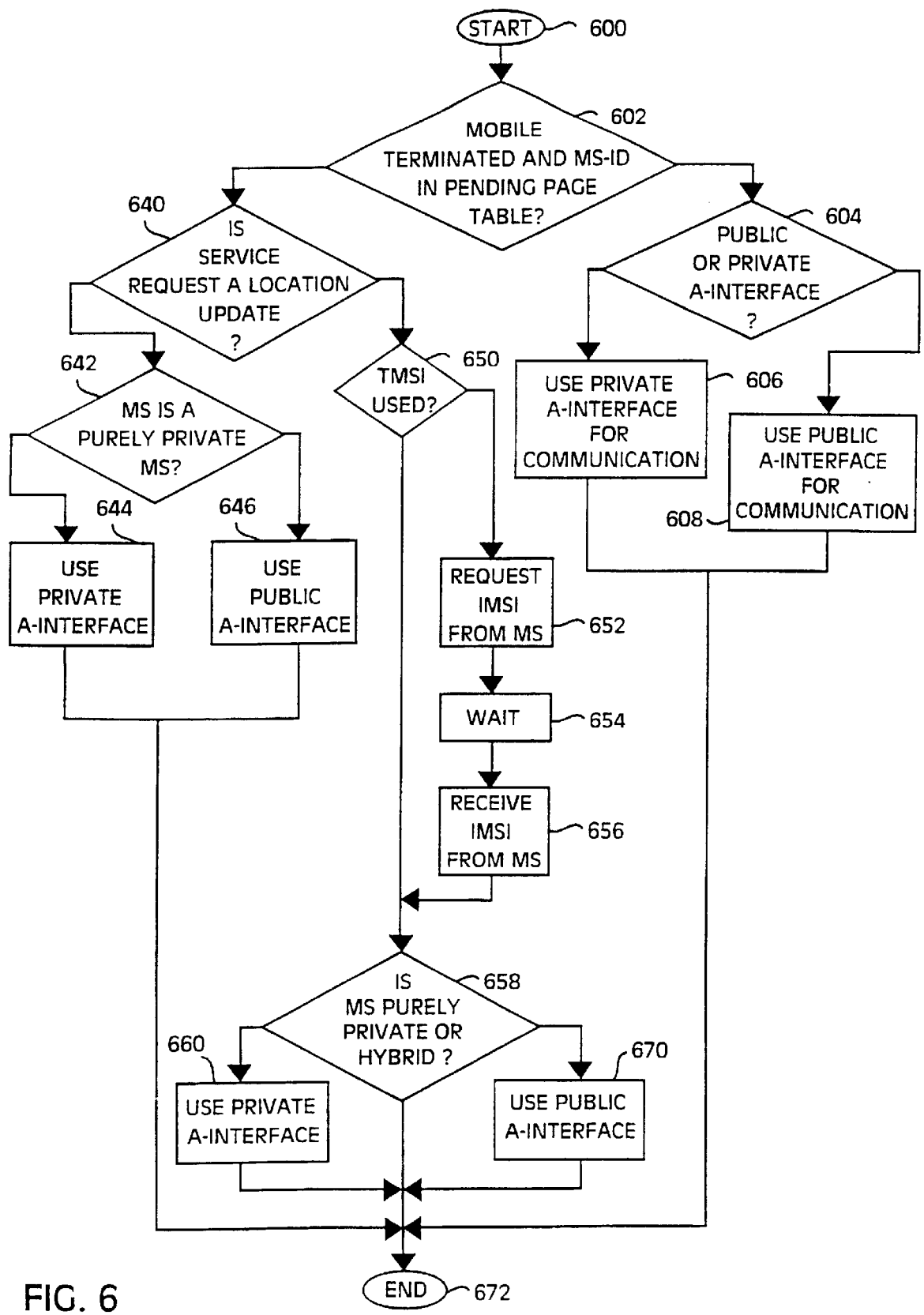
FIG. 6 shows, in accordance with one embodiment of the present invention, a technique employed by the multiplexing circuit for deciding whether the public A-interface or the private A-interface should be employed in building in the SCCP connection to an MS.

When private BSC 314 receives the identity of the MS that responded to the page request, e.g., from public MS 332 in this example, multiplexing circuit 330 compares the received identity (either IMSI or TMSI) against entries in Pending Page Table 500 of FIG. 5 to match up the Page Request and Page Response. The comparison step is represented symbolically in FIG. 4 by logic block 441. If the identity of the MS indicated by the Service Request message (piggybacked on SABM message 440) matches one of the pending entries in Pending Page Table 500, the associated A-interface identity (private or public), which is stored earlier in block 404, is then employed to allow the BSC 314 to establish the SCCP connection with the MSC through which the Page Request message was originally sent. FIG. 6 discusses in detail later herein one technique for determining which MSC should be involved in the building of the SCCP connection.

Note that for incoming calls to MS's within private coverage area 310, it may not be necessary to check with the private HLR of private multiplexing cellular network 300 to determine which interface (private or public) should be employed to service the call request. For further information regarding the private HLR, reference may be made to, for example, the above referenced co-pending patent application Ser. No. 08/435,709.

By storing in block 404 the identity of the destination telephone (using its TMSI or IMSI) and the identity of the interface through which the Page Request is sent, it is possible to match up (at a later time in block 441) the MS that issues the Service Request message (piggybacked on the SABM Page Response) with the earlier Page Request message to allow private BSC 314 to send messages from private BSC 314 back out the same A-interface through which the Page Request message is originally sent. Via this technique, the SCCP connection can advantageously be made from the destination MS identified by the Page Request message 402 to the correct MSC through which the Page Request is originally sent when the destination MS unit responds to the Page Request message.

In the context of FIG. 4, since the Page Request message 402 was sent through public MSC 326, multiplexing circuit 330 understands after consulting Pending Page Table 500 that the SCCP connection needs to be built from the public A-interface 329 to the destination MS. The COM L3 message 442 is therefore sent from private BSC 314 to public MSC 326 to establish the SCCP connection between those two entities. Once the SCCP connection is established, all subsequent messages between public MSC 326 and public MS 332 are routed through the SCCP connection. The messages may employ, for example, DTAP (direct transfer application part) within the radio subsystem.

The BSC, e.g., private BSC 314 of FIG. 4, will become involved again only when the MSC with which the SCCP connection is made wants to reassign the channel or disconnect the call. For example, during reassignment, the BSC needs to know which A-interface is employed for the call so the channel assignment messages from the controlling MSC can be properly interpreted. For example, when public MS 332 moves from a location area controlled by one BSC to a location area controlled by another BSC (irrespective whether those BSC's are controlled by private multiplexing cellular network 300 or public cellular network 302), the controlling public MSC 326 needs to participate in the inter-BSC handover. In one embodiment, the information about which A-interface being used is associated with the call control information stored for this connection in private BSC 314 so that channel assignment may be appropriately performed via the correct A-interface.

Note that in FIG. 4, the private MSC is not employed in the establishment of the SCCP connection (and subsequent building of the call via the established SCCP connection) between the public MSC and the private radio subsystem of private multiplexing cellular network 300. In this manner, cellular communication between the public MSC can be seamless irrespective whether the radio resource that handles the communication belongs to the private multiplexing cellular network or the public network.

FIG. 6 shows, in accordance with one embodiment of the present invention, the technique employed by multiplexing circuit 330 for deciding whether the public A-interface or the private A-interface should be employed in handling a service request. In block 602, it is ascertained whether the service request received by the multiplexing circuit is an MS-terminated call (i.e., an incoming service request) and whether the identity of the MS to be checked (identified by its IMSI or TMSI) exists in Pending Page Table 500.

For an incoming service request, i.e., a request to an MS within private coverage area 310, the MS identity to be checked in block 602 represents the identity of the destination MS. As discussed in connection with FIG. 4, the identity of the destination MS may be obtained from, for example, the Page Request message from the MSC. For an outgoing service request, i.e., a service request that originates from an MS within private coverage area 310, the MS identity to be checked in block 602 represents the identity of the originating MS. The identity of the originating MS may be obtained from, for example, the Channel Request message when an MS wishes to request a channel to begin communicating with the private radio subsystem.

If the service request represents an MS-terminated call and the MS identity to be checked in block 602 matches one of the entries in Pending Page Table 500, the MS to be checked represents an MS responding to an early Page Request message, e.g., Page Request 402 of FIG. 4. In this case, the method proceeds to step 604 to ascertain whether the original Page Request message that the MS is responding to arrived earlier via the public A-interface or the private-A interface. The identity of the A-interface through which the Page Request message arrived was stored earlier in Pending Page Table 500, along with the identity (IMSI/TMSI) of the MS identified by the Page Request message.

If the earlier Page Request message arrived via the private A-interface, the private A-interface is then employed to establish the SCCP connection between the private MSC and the MS whose identity is checked in FIG. 6 (as shown in step 606). On the other hand, if the public A-interface was the interface through which the Page Request message was sent earlier, the public A-interface would then be employed to establish the SCCP connection between the public MSC and the MS (as shown in step 608).

If it is ascertained in step 602 that the service request is not an MS-terminated service request, the outgoing, MS-originated service request may represent a request from an MS within the private coverage area to perform a location update, to make a call, or to send a short message. In this case, the method proceeds to step 640 wherein it is ascertained whether the outgoing service request represents a location update. If yes, the method proceeds to step 642 to service the location update.

In step 642, it is then ascertained whether the MS that issues the location update service request represents a purely private MS (i.e., not a hybrid MS) that sent an IMSI. In this case, the private A-interface is employed for the location update from the private MS to the private MSC (step 644). If the MS sent an TMSI (for the purpose of this example, assume that a private MS never issues a TMSI) or if the IMSI is not known to the private network or if the MS that originates the service request is a hybrid MS, the MS that requests the location update can be assumed to be a public MS or a hybrid MS, and the public A-interface is employed for the location update (step 646).

Note that location updates from hybrid MS's are made to the public MSC, thereby allowing the public network to keep track of hybrid MS's. In this manner, calls to hybrid MS's using their public telephone numbers may be handled by the public MSC. On the other hand, calls to hybrid MS's using their private telephone numbers require, in this embodiment, that the entire private network be paged (since the private MSC does not participate in location updates by hybrid MS's). Even then, however, the paging operation is not an expensive operation, particularly since private networks tend to be small.

If it is ascertained in step 640 that the outgoing service request is not a location update, the method proceeds to step 650 to begin servicing this outgoing service request. In step 650, it is ascertained whether the TMSI was sent. If the TMSI was received in connection with the outgoing service request, the IMSI is then requested in steps 652, 654, and 656 from the MS issuing the outgoing service request. The IMSI is desirable since the IMSI may be employed by the multiplexing circuit to ascertain whether this IMSI is known to the private network (i.e., belonging to a SIM that is associated with either a purely private MS or a hybrid MS). Once the IMSI is obtained (either directly from the outgoing service request or from steps 652/654/656), it is then ascertained in step 658 whether the IMSI is associated with a SIM known in the private multiplexing cellular network (i.e., either a purely private MS or a hybrid MS).

In one embodiment, the IMSI is compared against entries in the private HLR (in step 658) to ascertain whether this IMSI is associated with a private MS SIM, a hybrid SIM, or with a public MS SIM. In another embodiment, the private HLR downloads to the multiplexing circuit in advance the list of IMSI's that are known to the private network. When a check of step 658 is required, the checking can be done locally within the multiplexing circuit without wasting network bandwidth to check the HLR.

If the MS that issues the outgoing service request is a purely private MS or a hybrid MS (ascertained in step 658), the private A-interface is employed for servicing the outgoing service request. In other words, the private MSC is employed to handle outgoing service requests for MS's that are private or hybrid. On the other hand, if the MS that issues the outgoing service request is a public MS (ascertained in step 658), the public A-interface is then employed for servicing the outgoing service request.

Figure 7:
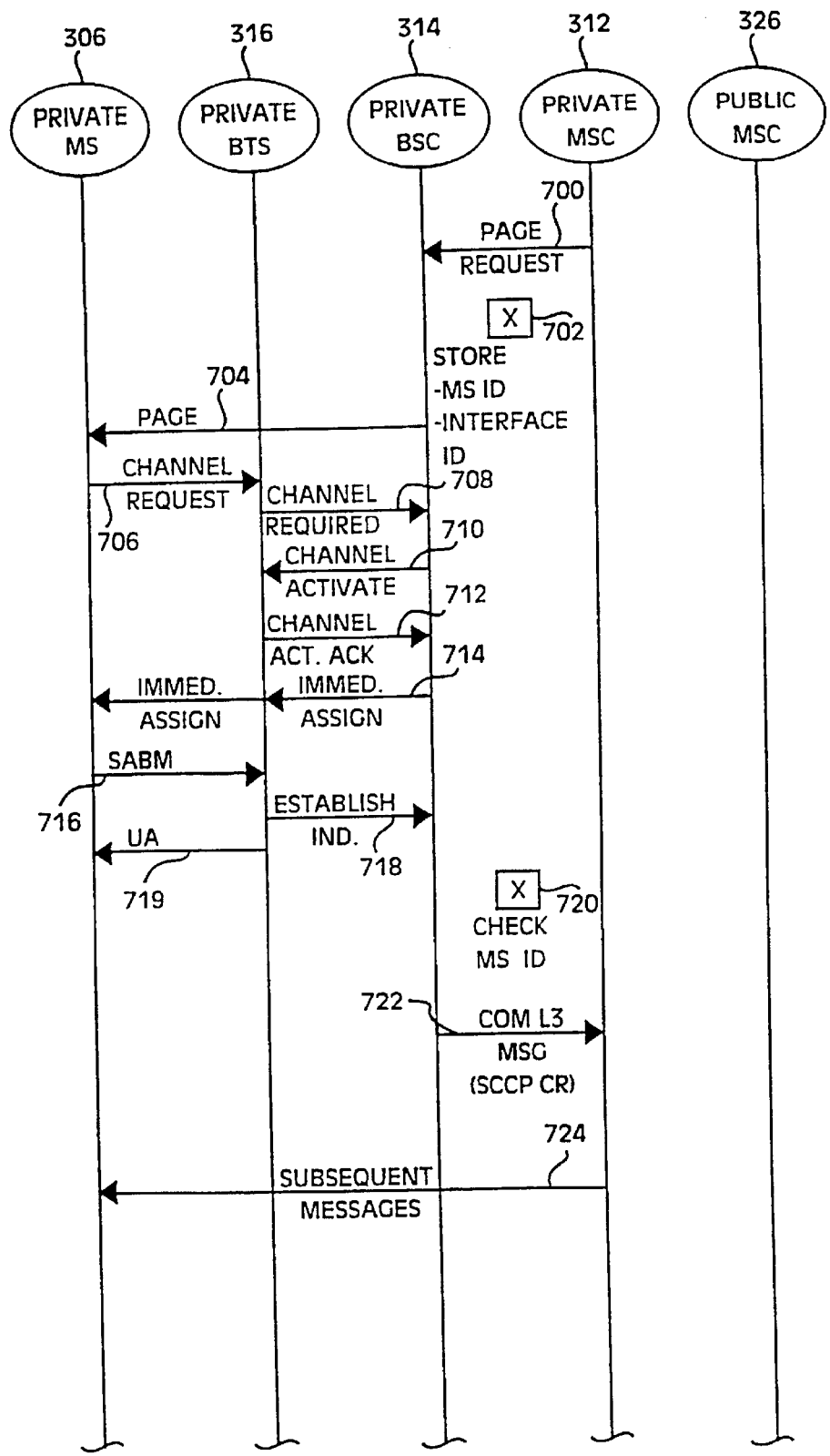
FIG. 7 illustrates, in accordance with one embodiment of the present invention, the general call flow for handling an incoming call request from the private MSC.

FIG. 7 illustrates, in accordance with one embodiment of the present invention, the steps involved when multiplexing circuit 330 handles a Page Request from private MSC 312 and facilitating the building of an SCCP connection between private MSC 312 to the MS being paged. Although private MS 306 is employed in FIG. 7 as the destination MS for ease of illustration, the Page Request message, when sent by the private MSC, represents a Page Request for an MS that is either a private MS or a hybrid MS but the private telephone number is dialed.

Referring now to FIG. 7, a Page Request message 700 is sent from private MSC 312 to private BSC 314 for a destination MS. The private MSC may wish to page an MS to initiate any type of cellular communication service, including SMS (short message service) or for regular calls (fax, voice, or data). The Page Request Message 402 is first received by multiplexer circuit 330 (on private BSC 314 in this example). In block 702, the identity of the destination MS, along with the identity of the A-interface through which the Page Request message 700 is sent (the private A-interface in the case of FIG. 7) is stored. In one embodiment, the identities of both the paged MS and the A-interface (public or private) are stored in an entry in Pending Page Table 500 of FIG. 5.

Private BSC 314 then pages private MS 306 via Page message 704. Thereafter, private MS 306 proceeds to establish a SCCP connection with private MSC 312. In one embodiment, these messages include Channel Request message 706, Channel Required message 708, Channel Activate message 710, Channel Activate Acknowledge 712, Immediate Assign 714 (which is forwarded via BTS 316 directly from private BSC 314 to private MS 306, SABM message 716, and Establish Indication (718). These messages have been discussed in detail earlier in connection with FIG. 4.

The identity of the destination MS (IMSI or TMSI) that responds with Page Response message 716 is then checked in block 720 of FIG. 7 against the pending Page Requests to ensure that the SCCP connection is correctly built between private MSC 312 and the paged MS. FIG. 6 discusses one technique for performing such an identity check. If the identity of the MS that sends the Page Response message 716 matches one of the entries in Pending Page Table 500, multiplexing circuit 330 will then ascertain, using the matched entry, the identity of the A-interface (whether private or public) through which the Page Request for this destination MS arrives.

The SCCP connection may then be built to the appropriate MSC (private MSC 312 in the case of FIG. 7). Messages involved in the completion of the SCCP connection includes the COM L3 message 722 from private BSC 314 to private MSC 312. Once the SCCP connection is established, all subsequent messages between private MSC 312 and private MS 306 may be routed through this SCCP connection.

Figure 8:
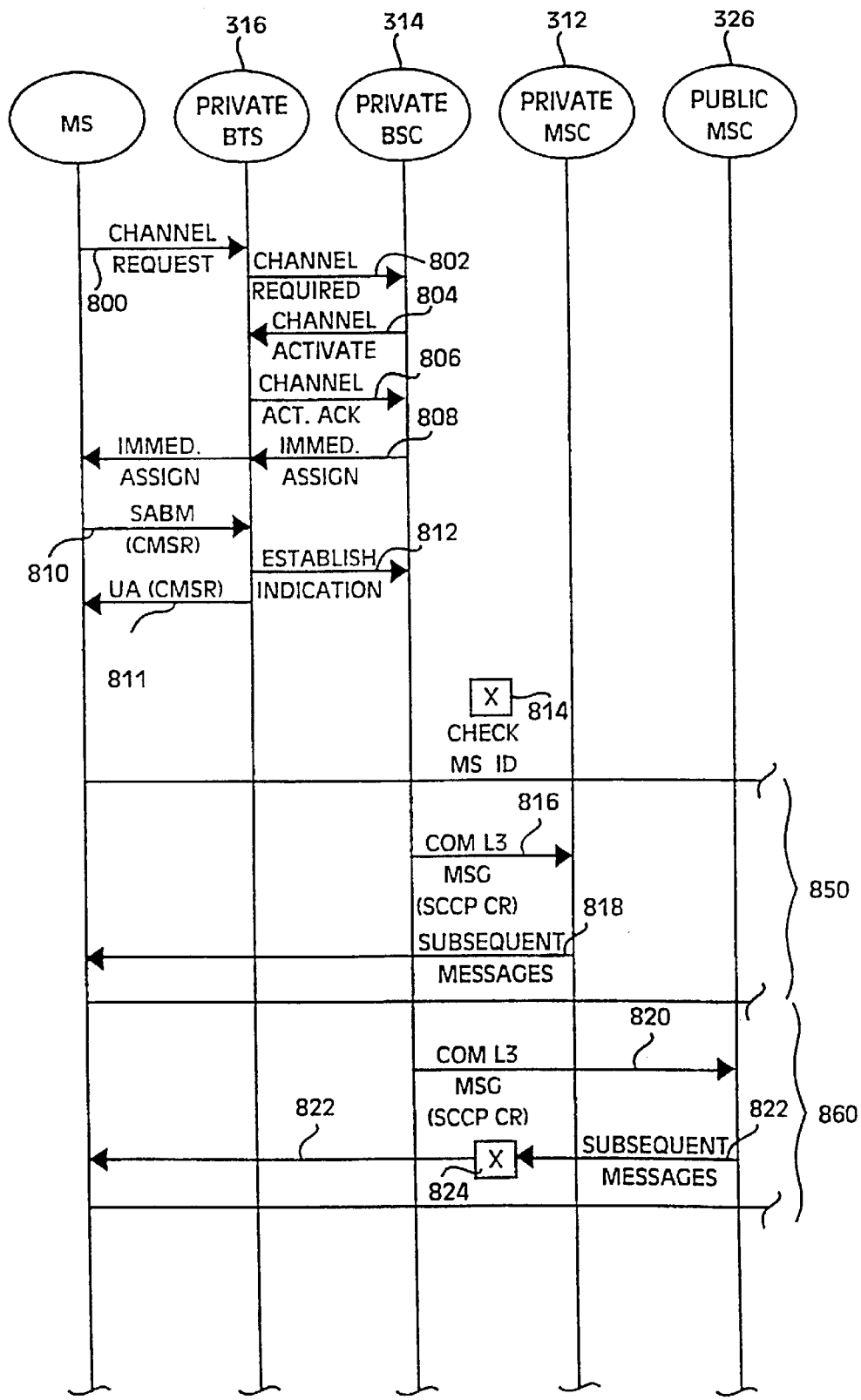
FIG. 8 illustrates, in accordance with one embodiment of the present invention, the general call flow for handling an outgoing service request by an MS within the private coverage area 310.

Again, note that it may not be necessary to access the private HLR to ensure that the SCCP connection is built between the correct MSC and the destination MS. Further, when the Page Request message arrives through private MSC 312, the public MSC is not involved, as shown in FIG. 7, in the building of the SCCP connection and the subsequent building of any call paths necessary to service the incoming call request. Advantageously, cellular communication appears seamless from the perspective of the private MS users and hybrid MS users. Furthermore, since the private MSC handles the calls for private MS's and incoming calls for hybrid MS's, advantages associated with a purely private cellular network (i.e., efficient cross-connecting, intelligent TRAUing, avoidance of public network charges) are still retained for these calls FIG. 8 illustrates the steps taken by multiplexing circuit 330 to handle an outgoing service request initiated by an MS within the private coverage area 310. As will be discussed in detail later herein, when the service request originates from a private MS or a hybrid MS, i.e., MS's that are known in private multiplexing cellular network 300, the SCCP connection is built from the originating MS to the private MSC to allow the private MSC to handle the outgoing call. On the other hand, if the service request originates from an MS whose identity is unknown by private multiplexing cellular network 300, e.g., the originating MS is a public MS, the SCCP connection is built from the MS with the unknown identity (IMSI) to the public MSC to allow the public MSC to handle the outgoing call attempt.

As shown in FIG. 8, an MS initiates an outgoing service request by issuing a channel request message 800. Messages 800, 802, 804, 806, 808, 810, 811, and 812 represent some relevant messages required to establish communication between an MS and a private BSC. These messages are similar to those discussed in connection with FIG. 4 and are not repeated here for simplicity of illustration.

In block 814, the identity of the originating MS, which identity (IMSI or TMSI) is included in the Service Request message piggybacked on the Establish Indication message 812, is checked by multiplexing circuit 330 of FIG. 3. FIG. 6 discloses a technique for checking the identity of the originating MS for the purpose of routing the SCCP connection to the appropriate MSC. If the originating MS represents an MS known in private multiplexing cellular network 300 (i.e., a private MS or a hybrid MS), the SCCP connection is made to private MSC 312 via multiplexing circuit 330. Messages that may be employed to establish this SCCP connection are shown in block 850 of FIG. 8.

On the other hand, if the identity of the originating MS indicates that the originating MS is not known in private multiplexing cellular network 300, the SCCP connection is then made between the originating MS and public MSC 326 (using the messages in block 860 of FIG. 8).

In one embodiment, the steps involved in checking the identity of the originating MS in private multiplexing cellular network 300 involves simply sending a proprietary MS ID Check request to the private HLR and receiving a proprietary response therefrom. In block 850 of FIG. 8, the SCCP connection is built between the originating MS and the private MSC 312. To facilitate the building of the SCCP connection, a Com L3 Message 816 is sent between private BSC 314 and private MSC 312.

In block 860 of FIG. 8, the SCCP connection is alternatively built between the originating MS and the public MSC 326 (the Com L3 Message is sent between private BSC 314and public MSC 326 in step 820). After the SCCP connection is made between the originating MS and the appropriate MSC, all subsequent messages flow through this SCCP connection. From the private BTS 316 or private BSC 314 point of view, the SCCP and the identity of the A-interface (public or private) are then known. This data may be employed subsequently to request circuit on the A interface to fully service the service request.

Figure 9:
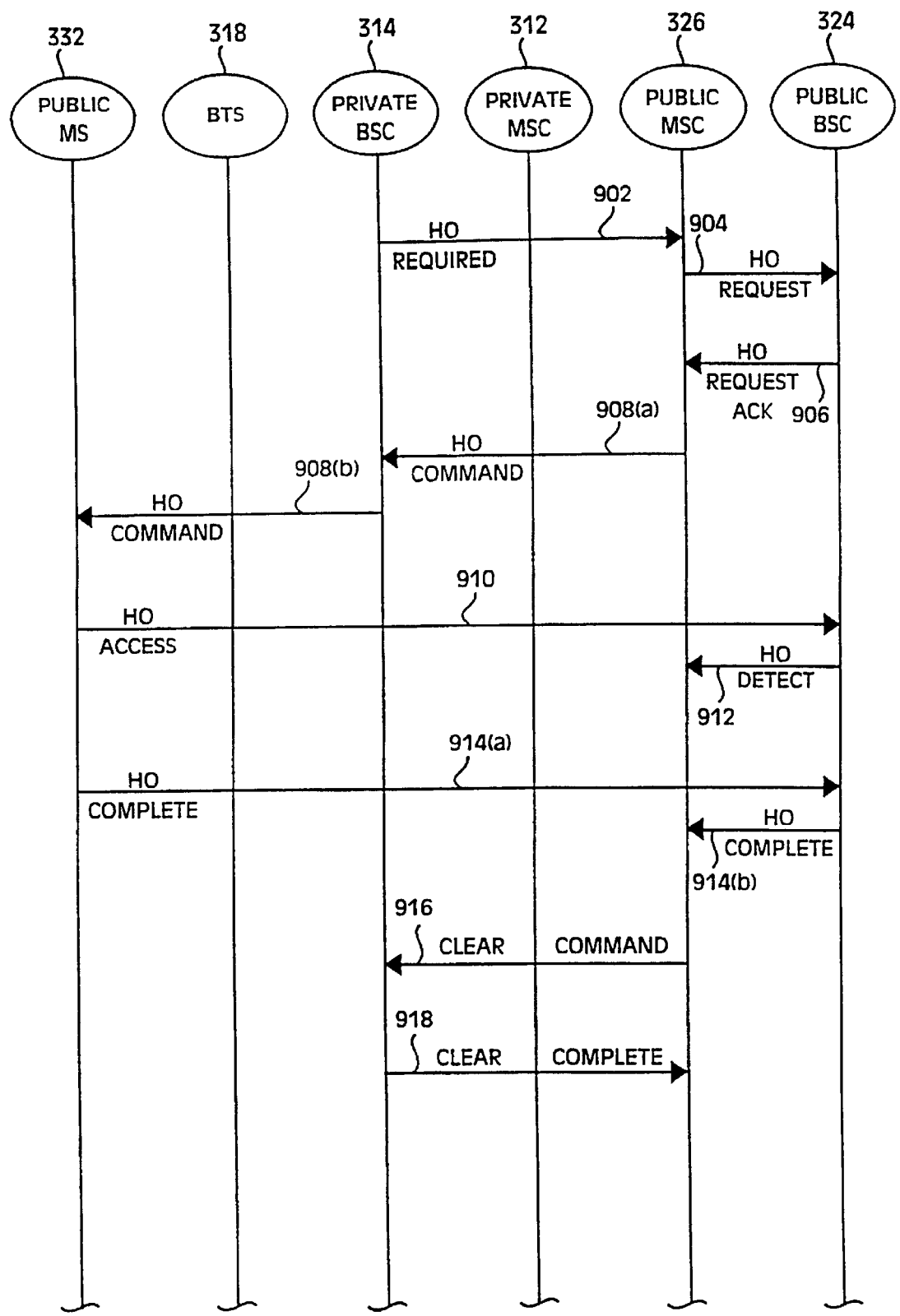
FIG. 9 illustrates, in accordance with one embodiment of the present invention, the general call flow for handling inter-BSC handovers.

FIG. 9 illustrates the general call flow for performing handover between a private BSC and a public BSC when the public MS wants to roam from the coverage area of a private BSC into the coverage area of a public BSC. The discussion of FIG. 9 is made with reference to the network illustration of FIG. 3, and reference may be made thereto to improve understanding.

Handover preparation by a BSC includes, for a particular connection, a determination of valid destination cell(s) from the set of potential destination cells reported by the MS. In the private muliplexing cellular network 300, the BSC's are required to differentiate the valid destination cells for MS handovers based on whether the MS is associated with a public MSC connection or a private MSC connection. For example, a public connection, i.e., a connection via public MSC 326, may regard cells that are on either side of public/private cell boundary 390 as proper destination cells for the purpose of handover. On the other hand, a private connection, i.e., a connection via private MSC 312, may not regard potential destination cells that are under control of public BSS 324 as proper destination cells for handover purposes. Preferably, private BSC 314 requests all MS's to report on all possible neighbor cells, including those associated with public BSS 324. It is the job of private BSC 314 to ascertain which of those potential destination cells may be employed for handover given a particular connection (public or private).

Note that since public BSC 324 only has to handle connections for the public MSC, public BSS 324 does not have to be modified, e.g., does not have to be endowed with the intelligence for eliminating potential destination cells in the manner required of private BSC 314. It simply needs to be reconfigured to be aware of the neighbor cells on the private side of private/public cell boundary 390.

Private BSC 314 then sends an HO Required message 902 to the controlling public MSC 326. The HO Required message includes information regarding the cell to be handed over to. Public MSC 312 ascertains the BSC that controls the destination cell. For the purpose of the present discussion, public BSC 324 is assumed to be the destination BSC, i.e., the BSC that controls the destination cell. Thus, public MSC 326 sends a Handover Request message 904 to public BSC 324 to inform destination public BSC 324 that a handover is imminent.

Public BS 324 then acknowledges the HO Request message 902 via the HO Request Acknowledge message 906. Public MSC 326 then sends a Handover Command message 908(*a*) to private BSC 314, which passes the received HO Command message 908(*a*) directly to public MS 332 (as HO Command message 908(*b*)). The HO Command 908(*b*) message directs public MS 332 to handover by telling public MS 332 the frequency to move to, the new frequency to listen to, and the like (this information was included in HO Request Acknowledge message 906 from destination public BSC 324 to public MSC 326).

Public MS 332 then communicates directly with public BSC 324 (i.e., the new destination BSC that controls the destination cell) via the HO Access message 910. Public BSC 324 then sends an HO Detect message 912 to public MSC 326 to inform public MSC 326 that public BSC 324 and public 332 have successfully communicated. Further, public MS 332 also sends an HO Complete message 914(*a*) to public BSC 324, which is passed on to public MSC 326 as HO Complete message 914(*b*). The HO Complete messages 914(*a*) and 914(*b*) indicate to public MSC 326 that handover is completed and public BSC 324 is now handling the radio resource for public MS 332.

Private BSC 314, representing the BSC that no longer handles the call for public MS 332, then receives a Clear Command message 916 from public MSC 326, which directs private BSC 314 to clear the SCCP connection between private BSC 314 and public MSC 326. After the SCCP connection is cleared, private BSC 314 acknowledges that the SCCP connection is clear via the Clear Complete message 918.

Although FIG. 9 illustrates in detail only the situation when a public MS wishes to handover from a private BSC to a public BSC, handover may be accomplished from a private BSC to another private BSC via messages similar to those shown in FIG. 9 except that the private MSC handles the handover. Handover between a public BSC to a private BSC is performed in a manner similar to that shown in FIG. 9 and is not repeated here. Further, if the handover is from a public BSC to a public BSC or from a private BSC to a private BSC (via public MSC 326), the handover may be accomplished using a GSM standard technique.

Note that in FIG. 9, handover is performed between network nodes below the MSC level. In other words, once an MS has its call handled by an MSC in the private world, a private MSC then handles the handover. Alternatively, once a call is handled by an MSC in the public network, a public MSC may then handle the handover. There is no handover from a public MSC to a private MSC, or vice versa. If a public MS begins its call within public coverage area 311 and moves into private coverage area 310, for example, handover may occur between the public radio subsystem and the private radio subsystem. All the while, however, the public MSC continues to handle the mobility management function for the call. Further, although public MS 332 is chosen in FIG. 9 to simplify illustration, handover is also performed for hybrid MS's that are called using their public telephone numbers.

Further, handover among interconnected private MSC's is also available. For further information regarding one technique for performing handover among interconnected private MSC's, reference may be made to the above referenced patent application Ser. No. 08/435,709. Handover among interconnected public MSC's may be accomplished using a conventional GSM technique.

In accordance with another aspect of the present invention, if private coverage area 310 and public coverage area 311 overlap, an MS such as public MS 332 or hybrid MS 306 may be instructed to give preference to either private coverage area 310 or public coverage area 311. A roaming hybrid MS can choose to lock onto the private network (via location updates) to avail its user of the advantages associated with the private network (e.g., lower calling costs). Alternatively, a roaming hybrid MS can choose to lock onto the public network if so instructed. Advantageously, the preference setting minimizes the number of times an MS unit hops from private coverage area 310 to public coverage area 311 and vice versa.

In some applications it may be desirable to limit the private network resources used by public MS's so as to preserve a minimum level of access for private and/or hybrid MS's in the private network cells in which public MS usage is permitted. By way of example, up to 20% of the radio bandwidth associated with these cells may be allocated to public MS's while at least 80% of the radio bandwidth resources should be allocated to private and/or hybrid MS units. Of course, the bandwidth reserved for private and/or hybrid MS's may be widely varied to meet the needs of a particular system.

Other priority resource allocation schemes may be used as well. By way of example, public MS's may be allowed to access any unused resources with the caveat that they may be "bumped" when resources they are using are subsequently required by private and/or hybrid MS's requesting access. Alternatively, public MS's may be permitted access any time there are available resources or available resources exceed a designated threshold. By way of further example, schemes that consider the location of the public MS within the private network, the traffic on the resources would actually be used by the public MS, etc. may also be employed. The ability to govern the sharing of resources between private and/or hybrid MS's and public MS's ensures that the private and/or hybrid MS's will not be unduly denied access to the resources of the private network by an excessive influx of calls involving public MS's and/or calls involving hybrid MS's using its public telephone number.

In another aspect of the present invention, a handover control table in the BSC, which includes data regarding neighbor cell relationship, preferably includes information to indicate whether the handover is allowed for a public connection, a private connection, or both. In one embodiment, this information may exist as a flag in the neighbor cell relationship entry of the table. By arbitrarily setting the value of this flag for a set of neighbor cell relationship entries, the boundary of the expansion of the public network into the private network may be arbitrarily restricted to a portion of the private network if desired. In this manner, a portion of the private network may remain strictly private, if such is desired.

Figure 10:
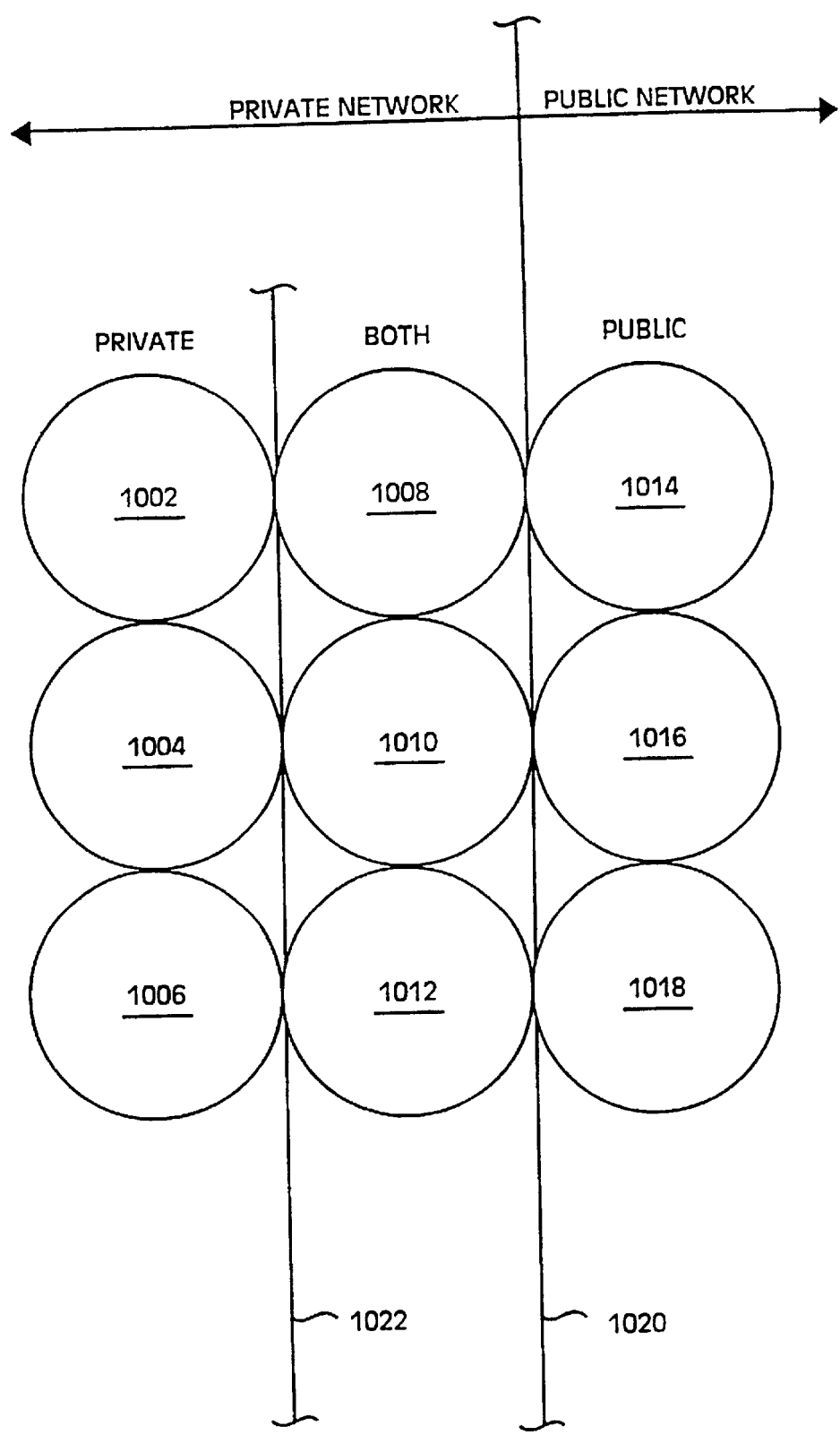
FIG. 10 illustrates, in accordance with one embodiment of the present invention, the different kinds of cells available in the public network and in the private network.

By way of example, FIG. 10 illustrates a plurality of cells 1002–1118 wherein cells 1002–1006 are purely private cells (i.e., only calls handled by the private MSC are allowed), cells 1008–1012 are cells that could handle both private and public calls (i.e., cells labeled as "both" in FIG. 10 and can handle calls through either the private MSC or the public MSC), and cells 1014–1018 are cells that handle only public calls (i.e., calls controlled by the public MSC). The location of line 1020 relative to the public and private networks is determined by the size of the private network, with cells to the left of line 1020 belonging to the private network and cells to the right of line 1020 belonging to the public network. Cells in the private network are controlled either by the private MSC or by the public MSC via the multiplexing circuit disclosed herein. Cells in the public network are controlled by the public MSC. Line 1022, which separate the purely private cells from cells that could handle both private and public calls can be arbitrarily placed anywhere within the private network by appropriately tagging each cell with a flag as mentioned earlier.

FIG. 11 illustrates, in one embodiment, a handover table 1102 suitable for use in ascertaining whether a potential destination cell for the purpose of handover for a given call can in fact be employed. Each entry of handover table 1102 includes a Designated Type field. The Designated Type field indicates whether this cell is designated, via an appropriate flag, a purely private cell, a cell that could handle both private and public calls, or a public cell. For example, cell 1002 of FIG. 10 is shown in handover table 1102 as a purely private cell. Cell 1008 of FIG. 10 is shown in handover table 1102 as a cell that could handle both private and public calls (labeled as "both" in FIG. 11). Likewise, cell 1010 is a cell that could handle both private and public calls. Cell 1014 of FIG. 10 is shown in handover table 1102 as a public cell, i.e., belonging to the public network.

FIG. 12 shows, in one embodiment, a decision matrix for determining whether, for a particular type of call, handover to a potential destination cell may be accomplished. If handover is desired, the handover table, e.g., handover table 1102 of FIG. 11, is first consulted to determine whether that potential destination cell is designated public, both, or private. This information is then employed, in combination with the call type information (public or private call) for the call associated with the handover attempt, in the decision matrix of FIG. 12 to determine whether a potential destination cell is appropriate for the call, thereby allowing handover to proceed. In one embodiment, the call type information, i.e., information regarding which MSC (public or private) currently controlling the call, is included in the call control block.

In FIG. 12, boxes 1204 and 1208 represent non-allowable combinations. For example, a public cell cannot accept a private call (box 1208). Analogously, a private cell cannot accept a public call (box 1204).

In box 1202, if the call type is public and the destination cell type is also public, then handover is allowed. As mentioned earlier, a public call is a call that is handled by the public MSC, and may either be a call to/from a public MS, a call from a hybrid MS while outside the private network, or a call to a hybrid MS using its public telephone number. In box 1210, if the call type is private and the destination cell type is also private, then handover is allowed. A private call is a call to/from a private MS, a call from a hybrid MS while inside the private network, or a call to a hybrid MS using its private telephone number. If the potential destination cell is cell that could handle both private and public calls then either a private call or a public call may be handed over to it (box 1206 and 1212).

Note that the presence of purely private cells, e.g., cells 1002–1006 of FIG. 10, may result in a "hole" in cellular coverage for public MS users. This is because a public MS, while inside the private network, may lock on to a purely private cell to initiate its service request if this purely private cell has the strongest signal. Unless a solution is developed to resolve this problem, the service request from the public MS will be denied by the private MSC, i.e., the entity that controls the purely private cell of this example.

One potential solution involves configuring all cells of the private network to work with the multiplexing circuit (thereby eliminating all purely private cells). Another potential solution involves purely private cells performing a directed retry for that public MS, which is essentially a handover from the purely private cell which receives the service request from the public MS to a cell that could handle a public MS. The cell that could handle a public MS may represent either a public cell or a cell that could handle both public and private calls (labeled "both" in FIG. 10). If the directed retry is successful, the service request may proceed via this new cell and the public MSC. If the directed retry attempt fails or if there are no neighboring cells capable of handling a public MS, the attempted call associated with the public MS may be dropped altogether.

As is apparent from the above discussion, not all cells of the private network need to be configured to work with the multiplexing circuit. The ability to allow some cells to remain purely private allows the private network to be flexibly configured and represents an option for reducing costs Although the foregoing invention has been described in some detail for purposes of clarity of understanding, it will be apparent that certain changes and modifications may be practiced within the scope of the appended claims. Given this disclosure, it will be apparent to those of ordinary skills in the art that combinations and substitutions may be made without departing from the scope and the spirit of the present invention. Consequently, the scope of the invention is not limited to the specific examples given herein but is set forth in the appended claims.

APPENDIX A

Glossary of Terms and Abbreviations

| | |
|---|---|
| Abis: | Protocol stack between a BTS and a BSC |
| ACM: | Address Complete Message |
| ANM: | Answer Message |
| BCF: | Base Station Control Function |
| BSC: | Base station Controller |
| BSS: | Base Station Subsystem |
| BTS: | Base Transceiver Station |
| CACB: | Cellular Adjunct Control Block |
| CAS: | Private multiplexing cellular network |
| CC: | Call Control Management |
| CCPU: | Cellular CPU |
| CO: | Central Office |
| cPBX: | cellular Private Branch Exchange |
| DSP: | Digital Signal Processing |
| GMSC: | Gateway for MSC |
| GSM: | Global Systems for Mobile Communication |
| CAS HLR: | Home Location Registry |
| IAM: | Initial Address Message |
| IMSI: | International Mobile Subscriber Identifier |
| IPN: | Interface to Public Network |
| ISDN: | Integrated Services Digital Network |
| IWF: | InnerWorking Functions |
| LAPD-M: | Link Access Protocol on the Dm (control) channel |
| MM: | Mobility Management |
| MS: | Mobile Stations |
| MSC | Mobile-Services Switching Center |
| OMC: | Operation and Management Center |
| PSTN: | Public Switched Telephone Network |
| PBX: | Private branch exchange |
| RF: | module Radio Frequency module |
| RL: | Radio Link |
| RR: | Radio Resource Management |

-continued

| | |
|---|---|
| SCCP: | Signaling Connection Control Part |
| SMS: | Short Message Services |
| SS: | Supplemental Services |
| TDM data: | Time Division Multiplexed Data |
| TRAU: | Transcoder-Rate Adapter Unit |
| TRX: | Transceiver |
| VLR: | Visitor Location Registry |
| VME: | An industry standard bus for interconnecting components |
| wPBX: | wired PBX |

APPENDIX B

The present disclosure is written for ease of understanding by those of skill in the art. For others, the following documents, incorporated herein by reference for all purposes, may be reviewed for additional information.

Mouly, Michel & Pautet, Marie-Bernadette, *"The GSM System for Mobile Communications"*, Mouly, Michel & Pautet, Marie-Bernadette, 1992.

European Telecommunications Standards Institute, *"European digital cellular telecommunications system (Phase 2); Mobile radio interface signaling layer 3 General aspects (GSM 04.07)"*, 1994, Valbonne—France.

European Telecommunications Standards Institute, *"European digital telecommunications system (Phase 2); Mobile radio interface layer 3 specification (GSM 04.08)"*, 1994, Valbonne—France.

European Telecommunications Standards Institute, *"European digital cellular telecommunications system (Phase 2); Mobile-services Switching Centre—Base Station System (MSC—BBS) interface Layer 3 specification (GSM 08.08)"*, 1994, Valbonne—France.

European Telecommunications Standards Institute, *"European digital cellular telecommunications system (Phase 2); Signaling transport mechanism specification for the Base Station System—Mobile-services Switching Centre (BBS—MSC) interface (GSM 08.06)"*, 1994, Valbonne—France.

European Telecommunications Standards Institute, *"European digital cellular telecommunications system (Phase 2); Base Station Controller—Base Transceiver Station (BSC—BTS) interface Layer 3 specification (GSM 08.58)"*, 1994, Valbonne—France.

European Telecommunications Standards Institute, *"European digital cellular telecommunications system (Phase 2); Mobile Application Part (MAP) specification (GSM 09.02)"*, 1994, Valbonne—France.

European Telecommunications Standards Institute, *"European digital cellular telecommunications system (Phase 2); Signaling requirements on internetworking between the Integrated Services Digital Network (ISDN) or Public Switched Telephone Network (PSTN) and the Public Land Mobile Network (PLMN) (GSM 09.03)"*, 1994, Valbonne—France.

What is claimed is:

1. In a private cellular communication system having a private mobile services switching center and a base station controller, said base station controller being configured to facilitate cellular communication for a plurality of private mobile stations and a plurality of public mobile stations associated with a public network having a public mobile services switching center, a method of facilitating cellular communication between the plurality of private mobile stations and the plurality of public mobile stations comprising steps of:

providing a multiplexing circuit coupled to said base station controller, said multiplexing circuit including a first interface circuit for coupling to said private mobile services switching center and a second interface circuit for coupling to said public mobile services switching center, said multiplexing circuit being configured to multiplex incoming and outgoing calls between said base station controller and one of said private mobile services switching center and said public mobile services switching center, wherein a call from one of said public mobile stations is handled through said public mobile services switching center and said base station controller via said multiplexing circuit when said one of said public mobile station is within a location area controlled by said base station controller, a call to one of said private mobile stations is handled through said private mobile services switching center and said base station controller via said multiplexing circuit when said one of said private mobile station is within a location area controlled by said base station controller; and receiving in the multiplexing circuit a Page Request message sent from public MSC.

2. The method of claim 1 wherein said base station controller is further configured to facilitate cellular communication for a plurality of hybrid mobile stations, each one of said hybrid mobile stations having a public telephone number and a private telephone number different from said public telephone number, a call to a given one of said hybrid mobile stations, when called using said public telephone number, is handled through said public mobile services switching center and said base station controller via said multiplexing circuit, a call to said given one of said hybrid mobile stations, when called using said private telephone number, is handled through said private mobile services switching center and said base station controller via said multiplexing circuit.

3. The method of claim 2 wherein a call from said given one of said hybrid mobile stations, when made from within said location area controlled by said base station controller, is handled by said private mobile services switching center through said multiplexing circuit.

4. The method of claim 3 wherein a call from said given one of said hybrid mobile stations, when made from within a location area controlled by said public network, is handled by said public services switching center without involving said multiplexing circuit.

5. The method of claim 2 wherein a call from said given one of said hybrid mobile stations, when made from within a location area controlled by said public network, is handled by said public services switching center without involving said multiplexing circuit.

6. The method of claim 1 wherein said base station controller is further configured to facilitate cellular communication for a plurality of hybrid mobile stations, each one of said hybrid mobile stations having a public telephone number and a private telephone number different from said public telephone number, a call to a given one of said hybrid mobile stations, when called using said public telephone number, is handled through said public mobile services switching center and said base station controller via said multiplexing circuit.

7. The method of claim 1 wherein said base station controller is further configured to facilitate cellular communication for a plurality of hybrid mobile stations, each one of said hybrid mobile stations having a public telephone number and a private telephone number different from said public telephone number, a call to said given one of said hybrid mobile stations, when called using said private telephone number, is handled through said private mobile services switching center and said base station controller via said multiplexing circuit.

8. The method of claim 1 wherein said first interface circuit implements a private A interface and said second interface circuit implements a public A interface.

* * * * *